US005723166A

United States Patent [19]

Theuer et al.

[11] Patent Number: 5,723,166

[45] Date of Patent: Mar. 3, 1998

[54] USE OF LIGHT FLESHED VEGETABLES IN BABY FOOD

[75] Inventors: Richard C. Theuer, Chesterfield, Mo.; Craig S. Boyer, Boyes Hot Springs, Calif.; Richard F. Russo; Gerald E. Shaul, both of Canajoharie, N.Y.

[73] Assignee: Beech-Nut Nutrition Corporation, St. Louis, Mo.

[21] Appl. No.: 604,616

[22] Filed: Feb. 21, 1996

[51] Int. Cl.$^6$ .................................................. A23L 1/29
[52] U.S. Cl. ........................ 426/615; 426/637; 426/801
[58] Field of Search ............................... 426/615, 801, 426/637

[56] References Cited

U.S. PATENT DOCUMENTS

| | | | |
|---|---|---|---|
| 4,911,943 | 3/1990 | Slimak | 426/629 |
| 4,923,709 | 5/1990 | Slimak | 426/640 |
| 4,925,696 | 5/1990 | Slimak | 426/637 |
| 4,925,697 | 5/1990 | Slimak | 426/637 |
| 4,929,467 | 5/1990 | Slimak | 426/637 |
| 4,946,703 | 8/1990 | Slimak | 426/637 |
| 5,204,137 | 4/1993 | Slimak | 426/637 |
| 5,244,689 | 9/1993 | Slimak | 426/629 |
| 5,248,515 | 9/1993 | Payton et al. | 426/599 |

OTHER PUBLICATIONS

Accashian, Carmen, "How Safe Are Some Baby Foods" from Denver Post, Sep. 8, 1985, cutout.
Congdon, P.J. et al, "Benign Carotenemia in Children" from Archives of Disease in Childhood, 1981, pp. 292–294.
Food & Nutrition Board, Commission On Life Sciences National Research Council, Selections from Chapter 7, "Fat–Soluble Vitamins" from Recommended Dietary Allowances, 10th Ed., 1989, pp. 78–81.
Hunter Associates Laboratory, Inc., Workshop course notes from Hunterlab Colorlab, 1992–93.
Lascari, Andre D., M.D., "Carotenemia, A Review" from Clinical Pediatrics, 1981,pp. 25–29.
Lopez, Anthony/Editor, Chapter 11 from "A Complete Course in Canning", 12th Ed., 1987, pp. 437–447.
Lui, Nan Sen Tseng & Roels, Oswald A., Selections from Chap 6, "The Vitamins" from Modern Nutrition in Health & Disease, 6th Ed., 1980, pp. 148–149, 154–159.
Olson, James A., Selections from Chapter 11, "Vitamin A" from Present Knowledge in Nutrition, 6th Ed., 1990, pp. 96–97.
O'Neil, R.R., M.D., Lowe, C.U., M.D., "Benign Carotenemia of Infancy" from Pediatrics, 1963, pp. 692–693.
Rubatzky, Vince, et al, Announcement concerning 1994 Hybrid Carrot Trial, Jan. 26, 1994, letter and 4 page attachment.
Stirling, H.F., et al, "Hypercarotenaemia & Vitamin A Overdosage" from Proprietary Baby Food, The Lancet, May 10, 1986, p. 1089.
Theuer, Richard C., Ph.D., "Feeding Baby Right, How Food Can Turn Your Baby Yellow", late 1980s, one page.
Treneman, Ann, "Baby Foods May Couse Carotenemia" from The Evening Press, Oct. 10, 1983,Sec. B.
Unknown, "Vitamins in Baby Food" from New York Times, May 4, 1983, cutout.
C.F.R. §113, "Thermally Processed Low Acid Foods Packaged in Hermetically Sealed Containers", Apr. 1, 1994, pp. 227–253.
Burros, Marian, "Eating Well"from The New York Times, Feb. 21, 1996, Sec. B.

*Primary Examiner*—Helen Pratt
*Attorney, Agent, or Firm*—Herzog, Crebs & McGhee, LLP

[57] ABSTRACT

Orange carrots have a beta-carotene content of 75–150 ppm. Orange carrots are commonly used in strained baby foods. The high beta-carotene content of orange carrots results in a high vitamin A statement on the product label and causes the product to have an orange color. White carrots and yellow carrots have a beta-carotene content of less than 10 ppm. White carrots and/or yellow carrots can be used in lieu of, or in combination with, orange carrots to control beta-carotene levels and the color of baby foods. White sweet potatoes can be used in lieu of, or in combination with, white carrots, orange carrots and orange sweet potatoes to control beta-carotene levels and the color of baby foods. The term white sweet potatoes refers to tubers of light colored flesh of the species *Ipomea batata*, of the morning glory family, Convolvulaceae.

31 Claims, No Drawings

USE OF LIGHT FLESHED VEGETABLES IN BABY FOOD

BACKGROUND OF THE INVENTION

Commercially prepared baby foods are often categorized into different groups, such as juices, fruits, vegetables and dinners. Dinners are foods that normally include one protein rich food as a characterizing ingredient with names that describe some, but not the totality of the contents, e.g., macaroni and beef; vegetable-chicken and turkey-rice. Similarly, vegetables are foods that include one or more vegetables with names that are generally descriptive, e.g., mixed vegetables.

From a historical perspective, these dinners and vegetables often contained a) orange carrots and b) fillers such as starches and flours. For example, Beech-Nut Nutrition Corporation (Beech-Nut), the assignee of the present patent application, once produced a macaroni and beef dinner that included approximately 17% orange carrots and approximately 4% rice starch and rice flour by weight, and a turkey-rice dinner that included approximately 17% orange carrots and approximately 7% rice starch and rice flour by weight. Mixed vegetables included approximately 25% orange carrots and approximately 5% rice starch and rice flour by weight.

In the early 1990s, Beech-Nut decided to change its formulations and introduce a "whole food concept" which would drastically reduce or eliminate the starch and flour fillers. One way to implement this whole food concept was to increase the amount of orange carrots in the baby food formula. Orange carrots are widely cultivated, economical to produce and are available year round to baby food producers in a fresh or frozen form. Unfortunately, an increase in the orange carrot content of the baby food resulted in two undesirable results.

First, the increased orange carrot content increased the chances that a baby would develop carotenemia, which will be discussed in greater depth below. Second, the increased carrot content tended to give all of the different dinners a generally orange color. Mothers prefer to feed their babies a diverse diet, composed of a wide variety of foods, perceiving it to be more healthy. Mothers judge variety, at least in part, on the colors of the baby foods. It is therefore advantageous from a marketing perspective to differentiate the dinners by name and overall appearance, without the use of fillers.

One way to address these undesirable results is to decrease the amount of orange carrots and increase the amount of peas or other green vegetables, e.g., broccoli and green beans, in the formula. Unfortunately peas, broccoli and green beans are more expensive than orange carrots on an equivalent consistency basis, and so are less viable economic alternatives. Until the present invention was discovered, the aforementioned undesirable results were implicit in dinners that were produced using the whole food concept.

In addition to the color differentiation problem, carotenemia can occur in some babies fed baby foods that contain orange carrots or other foods rich in carotenoids. Carotenemia is a condition of yellowish discoloration of the skin resulting from ingestion of large amounts of food containing carotenoids. Carotenemia is most likely to be confused with jaundice but can be distinguished clinically by the absence of yellow pigmentation of the sclera and mucous membranes. The importance of carotenemia is that it should be properly identified and not confused with jaundice. Although carotenemia is a benign condition, it may arouse considerable anxiety in parents and can lead to unnecessary medical evaluation.

All carrots are described botanically as Daucus carota; however, Americans are most familiar with orange carrot cultivars. Historically, these orange carrots had a beta-carotene content of 50–100 ppm (8,350 International Units ["IU"]–16,700 IU per 100 grams). For purposes of comparison, the average cantaloupe has a beta-carotene content of approximately 15–20 ppm. However, Americans have become fascinated with the perceived benefits of beta-carotene, and carrot breeders have developed new cultivars that have even a higher beta-carotene content—in the range of 75–150 ppm (12,525 IU–25,050 IU per 100 grams). It is believed that the beta-carotene content of orange carrots commercially available in the U.S. may increase in the future due to the development of new cultivars that contain even more beta-carotene. Largely unknown in America are other carrot cultivars that can be called "white carrots," that have a beta-carotene content of less than 10 ppm (1667 IU per 100 grams). Another type of carrot also exists that is generally called a "yellow carrot," that also has a beta-carotene content of less than 10 ppm. In cold storage, some white carrots can become yellow and vice versa.

It has been found that white and/or yellow carrots can be used in lieu of, or in combination with, orange carrots in baby food to reduce the level of beta-carotene and thus the risk of carotenemia and simultaneously to generate color variety in the visual appearance of the product. White carrot cultivars are little known in the United States. Some white carrot cultivars are grown abroad, primarily as a forage crop for livestock. Applicants are not aware of any U.S. patent art that refers to white carrots.

It has also been found that white sweet potatoes can be used in lieu of, or in combination with, white carrots and orange carrots to achieve the aforementioned results. The term "white sweet potatoes" refers to tubers of light colored flesh of the species Ipomoea batata, of the morning glory family, Convolvulaceae, having a beta-carotene content of less than 20 ppm.

White sweet potatoes are known in the patent art, i.e., see U.S. Pat. No. 4,925,697 entitled "Process for Products from Sweet Potato"; U.S. Pat. No. 5,204,133 entitled "Process for Products from Sweet Potato and U.S. Pat. No. 5,244,689 entitled "Flour, Bread, Milk and Other Products from White Sweet Potatoes, Cassava, Edible Aroids, Amaranth, Yams and Lotus." All of these patents are related and have a common inventor, Karen M. Slimak. Some of the aforementioned patents disclose the use of white sweet potatoes as the primary constituent of a hypoallergenic flour that can be used in lieu of wheat flour. These patents teach that such flour can be used in an infant formula, but make no mention of direct use of the undried and unground vegetable tuber or root in baby food. Other related patents by Ms. Slimak are listed on the Information Disclosure Statement which is filed concurrently herewith.

Parsnips are known in the art to have been used in baby foods. Parsnips are the white or yellowish root of the species *Pastinaca sativa*. Parsnips can be used in lieu of, or in combination with, orange carrots to reduce beta-carotene levels. Both parsnips and white sweet potatoes have disadvantages that will be discussed below. In the best mode, white and/or yellow carrots are preferred.

SUMMARY OF THE INVENTION

White and/or yellow carrots and/or white sweet potatoes are used in lieu of orange carrots and/or orange sweet potatoes or in combination therewith to control the beta-carotene level and the color of a baby food.

DESCRIPTION OF THE PREFERRED EMBODIMENT

Vitamin A designates a group of compounds essential for vision, growth, cellular differentiation and proliferation, reproduction and the integrity of the immune system. Humans can absorb vitamin A directly or they can convert certain carotenoids with provitamin A activity into vitamin A. The Recommended Dietary Allowances ("RDA"), revised in 1974, of vitamin A are: for infants and children up to 10 years, from 1,400 to 3,300 IU; for adult females, 4,000 IU; for adult males, 5,000 IU; for pregnant women, 5,000 IU; for lactating women, 6,000 IU. For infant food labeling purposes, a figure of 1500 IU of vitamin A is the Recommended Daily Intake ("RDI") upon which current food vitamin A declarations are based.

Carotenoids are pigments that are widely distributed in plant tissues. These pigments, which are also referred to as retinoids, are characterized by their red, yellow and orange colors. Carotenoids vary qualitatively and quantitatively in vitamin A activity. Only 50 of approximately 600 carotenoids found in nature have provitamin A activity and therefore can be converted in the body to vitamin A.

The occurrence of a pigmented carotenoid in food should not necessarily be taken as an indication of its value as a source of provitamin A that the body converts into vitamin A. For example, some yellow pigments, xanthophylls, that occur in squash, and some red pigments, lycopenes, that occur in tomatoes have no vitamin A activity whatsoever.

Vitamin A is a fat-soluble vitamin that is stored primarily in the liver. In the human diet, vitamin A is derived primarily from two sources: 1) provitamin A from fruits and vegetables and 2) preformed vitamin A from animal sources. The richest sources of preformed vitamin A are liver and fish liver oils. Appreciable quantities are also present in whole and fortified milk and eggs. Because only a few carotenoids serve as pro-vitamin A compounds and because many other yellow and orange carotenoid and other pigments are present in plants, the color intensity of a fruit or vegetable is not a reliable indicator of its content of provitamin A.

Vitamin A is highly toxic when given in excess. This condition is sometimes referred to as acute hypervitaminosis A. Massive doses of beta-carotene are not converted to vitamin A efficiently enough to induce vitamin A toxicity, but excess carotene accumulates in the body and may cause carotenemia, discussed above. Cooking and pureeing of vegetables ruptures cell membranes and thereby makes beta-carotene more available for human absorption. Because of this absorption phenomenon, babies that are fed strained baby foods with a high carrot content are particularly susceptible to carotenemia. Orange carrots are probably the most common cause of dietary carotenemia, especially in babies.

Government labeling requirements mandate that the amounts of vitamin A and C and calcium and iron be printed on the label of baby foods, expressed as a "Percent of Daily Value" per serving. The term "Percent of Daily Value" is typically printed on the label as "% Daily Value." For baby foods, the percentage of Daily Value of vitamin A means the percentage of the "Reference Daily Intake" of 1500 IU in each jar. For example, if the label on a jar of baby food under the column % Daily Value stated 100%, it would contain no less than 1500 IU of vitamin A; if it stated 50%, it would contain no less than 750 IU of vitamin A. Food producers must therefore carefully categorize and measure the carotenoid pigments in food products. Chromatographic separation of different carotenoid pigments is believed to be the most accurate method currently available to identify those carotenoids that have vitamin A activity. The officially recognized method for measuring vitamin A is the procedure published by the Association of Official Analytical Chemists (AOAC), which is known to those skilled in the art.

In the pilot plant experiments documented hereinafter, high-pressure liquid chromatography ("HPLC") was used to separate beta-carotene from alpha-carotene and other carotenoids. Beta-carotene is the most active carotenoid and makes the most important quantitative contribution to human nutrition concerning vitamin A. Beta-carotene is the predominant carotenoid pigment in orange carrots. The predominant carotenoid pigment in yellow and white carrots is believed to be xanthophyll.

In the early 1980s, different baby food manufacturers used different methods to calculate the amount of vitamin A in their products. Today the FDA enforces a generally common conversion ratio range from the National Academy of Sciences that ensures generally uniform labeling.

White and/or yellow carrots are believed to be the best ingredient that can be used in lieu of, or in combination with, orange carrots to control the beta-carotene content and color of baby food. Other economically attractive vegetables, e.g., white sweet potatoes and parsnips, have a low beta-carotene content; however, there are associated disadvantages not present if white and/or yellow carrots are used.

For example, white sweet potatoes cannot be frozen with the same degree of success as white and/or yellow carrots. The year round availability of ingredients is an important economic consideration to food processors. White sweet potatoes are a starchy material that requires careful processing to convert a portion of the starch to sugars. If the conversion is not achieved, starch separation occurs in the finished product which is unsightly. The unsightly appearance of separated starch leads to consumer complaints.

Freshly harvested sweet potatoes are normally cured by exposure to temperatures of about 85° F. and high relative humidity for about four to seven days to allow the tuber to heal any injuries received during harvesting and handling. During the home baking of sweet potatoes, the gradual rise in the internal temperature of the sweet potato acts first to activate amylolytic (amylose starch hydrolyzing) enzymes naturally present in the sweet potato and later to inactivate these enzymes as the tuber becomes fully cooked. The amylolytic enzymes convert the amylose type of starch into simpler carbohydrate molecules, particularly maltose, which gives the characteristic sweet mellow flavor of baked sweet potatoes.

It is known to those skilled in the art that commercial processing of sweet potatoes into a puree suitable for baby food requires a similar time course of temperature exposure to effect this activation and subsequent inactivation of the amylolytic enzymes present in sweet potatoes, in order to achieve the natural sweet mellow flavor of sweet potatoes and also to reduce the amount of the amylose type of starch, which is known to be more likely to separate from the sterilized sweet potato puree, causing the unsightly phenomenon known as "starch separation."

This commercial processing involves comminuting peeled sweet potatoes, heating the comminuted sweet potatoes to a temperature of no less than about 140° F. and no more than about 180° F., holding the comminuted sweet potatoes at this temperature for a period of time until the desired degree of conversion of amylose starch to simpler carbohydrate has been achieved, and then increasing the temperature of the comminuted sweet potatoes to a temperature equal to or greater than 190° F. to inactivate the amylolytic enzymes. Failure to effect this enzymatic conversion of the amylose starch of sweet potatoes is known to cause "starch separation" in the finished baby food.

Thus, as used herein, a "comminuted whole food" refers to comminution of the entirety of a food such as a vegetable or tuber thereof or of the entirety of a portion of the food (such as a peeled sweet potato).

Parsnips also have associated disadvantages that are not present in white and/or yellow carrots. Parsnips are grown for their sub-surface root like carrots; however, parsnips have two disadvantages. First, they are known as a cumulator crop. A cumulator crop can draw environmental contaminants, e.g., chlorinated hydrocarbons, from the soil, if any are present, and store them in the edible root. If such substances are present in the parsnip, they are likely to be present in products which use such parsnips as an ingredient. Another disadvantage of parsnips is that they contain psoralen, a substance which is thought to be mutagenic. Psoralen also causes a rash in some individuals. In summary, white and/or yellow carrots have a number of advantages as follows: they do not contain psoralen; are not a cumulator crop; have no starch separation problems; can be easily frozen; and are readily available and economical. Furthermore, use of white and/or yellow carrots in baby food that already contains carrots does not require a significant label change such as would be required by the addition of a new ingredient such as parsnips or sweet potatoes.

Seed for white carrots can be purchased in the United States from Ochoa Seed Company of Gilroy, Calif. Applicant purchased a cultivar of white carrot seed identified as Sunseeds No. W8821 from Ochoa, which was used to grow the white carrots that were used in the experiments described hereinafter. White forage carrot seed is also available in Europe from Royal Sluis, a seed company in the Netherlands.

By substituting the relatively low beta-carotene level foods for at least a portion of the relatively high beta-carotene foods (for example, substituting white carrots, yellow carrots, white sweet potatoes or some combination thereof for orange carrots), therefore, baby foods of a reduced level of beta-carotene (that is a beta-carotene level lower than that of the unsubstituted baby food) can be prepared. As shown in the working examples that follow, beta-carotene levels as desired can be selected by selecting the extent of substitution of the relatively high beta-carotene food ingredient by the relatively low beta-carotene level food. Thus, baby foods of, for instance, less than 20 ppm, or even less than 1 ppm, by weight beta-carotene can be prepared.

In order to test the feasibility of using white carrots in lieu of, or in combination with, orange carrots, applicant conducted a number of pilot plant experiments which are designed to mimic full scale production. Five products were tested as follows: 1. Beef Dinner Supreme®; 2. Macaroni & Beef Dinner; 3. Turkey-Rice Dinner; 4. Vegetable-Beef Dinner; and 5. Mixed Vegetables. For each product that was tested, five samples were prepared. Different percentages of white carrots were added to four of the samples to determine the effects on beta-carotene levels and the color of the product. The first carrot combination included 75% orange and 25% white carrots; the second included 50% orange and 50% white. The third included 25% orange and 75% white; and the fourth formula included 100% white carrots. As a control, one sample with 100% orange carrots was also produced.

EXAMPLE 1

Five different samples of Beef Dinner Supreme were prepared in the pilot plant and assigned numbers PP5530, PP5531, PP5532, PP5533 and PP5534. These samples had the characteristics shown in Table 1 below.

TABLE 1

| Beef Dinner Supreme | | | | |
|---|---|---|---|---|
| | Relative Proportions of | | Beta | Beta Carotene Expressed |
| Sample Number | Orange Carrots | White Carrots | Carotene ppm | As Vit. A % DV/serv. |
| PP5530 | 100% | 0% | 33.1 | 416% |
| PP5531 | 75% | 25% | 30.9 | 388% |
| PP5532 | 50% | 50% | 14.4 | 180% |
| PP5533 | 25% | 75% | 8.2 | 102% |
| PP5534 | 0% | 100% | 0.2 | 3% |

The data reported in the column headed "Beta-Carotene, ppm" were generated by HPLC separation of the beta-carotene in the product.

The figures in the column headed "Beta Carotene Expressed As Vit. A % DV/serv." were calculated from the beta-carotene content using the conversion factor of 1 IU per 0.6 mcg of beta-carotene, allowing for the RDI of 1500 IU for infants and a 113-gram (4-ounce) serving size. These latter figures thus represent the total provitamin A activity contributed by the beta-carotene analytically determined to be present in these samples. Sample PP5530, produced with 100% orange carrots, contains by analysis beta-carotene equivalent to 416% of the recommended amount of vitamin A to be consumed by a baby on a daily basis. In sharp contrast, Sample PP5534 which was produced with 100% white carrots contains by analysis beta-carotene equivalent to 3% of the Daily Value.

By way of further comparison, the label for Beef Dinner Supreme currently produced by Beech-Nut has a declared vitamin A Daily Value of 240%. The current commercial formula for Beef Dinner Supreme used by Beech-Nut uses 100% orange carrots. This label declaration may vary from HPLC analytical results on a given sample because of several factors as follows: 1) Label declarations are based on analyses of composite samples (one composite per year). 2) Label declarations are normally based on an average of three years of samples. 3) Federal regulations require that no analytical value for vitamin A may be less than 80% of the declared value, thus leading to a claim significantly less than the arithmetic average. 4) Use of the official AOAC method which also measures alpha-carotene rather than the HPLC method for beta-carotene separation and analysis.

The color of the baby food was measured on a Hunterlab Colormeter. This apparatus measures color based on the Opponent Colors Theory, which assumes there are 3 receptors in the human eye which receive opposing color signals perceived as: 1) Light-Dark; 2) Red-Green and 3) Yellow-Blue. This is a three-dimensional system similar to Munsell, except that the dimensions are rectangular, not cylindrical. The dimensions of this system are considered to correspond most closely to the visual signals from eye to brain. The color is defined using the units of measure L, a and b. The "L" measure can vary from 0 to 100. These five samples of Beef Dinner Supreme exhibited the color characteristics as shown in Table 2 below.

TABLE 2

| Beef Dinner Supreme Hunterlab Colormeter Results | | | |
|---|---|---|---|
| Sample | L | a | b |
| PP5530 | 50.14 | 10.15 | 31.07 |
| PP5531 | 51.93 | 9.43 | 31.28 |
| PP5532 | 53.28 | 7.50 | 30.11 |
| PP5533 | 53.16 | 6.02 | 27.89 |
| PP5534 | 55.51 | 2.67 | 20.00 |

Pilot Plant Preparation of Sample PP5530

The pilot plant produced these samples on a batch basis, each batch weighing approximately 100 lbs. The pilot plant procedures are designed to mimic commercial scale production. However, the two procedures are not identical. Commercial production will also be done on a batch basis, each batch ordinarily weighing approximately 3,000 lbs. The procedures for commercial production will be discussed in greater detail below.

Pilot plant production of sample number 5530 for a Beef Dinner Supreme was accomplished using a two step procedure i.e., first, a vegetable puree containing carrots and green beans is prepared; second, the vegetable puree is combined with other ingredients to produce the Beef Dinner Supreme. Sample number 5530 used a formula with 100% orange carrots. The vitamin A analysis was 416% of the Daily Value per serving.

Step-One—Pilot Plant Puree Production. Eighty lbs. of frozen orange carrots and 10 lbs. of frozen green beans were placed in a Fitzpatrick Comminutor, Model No. D, at medium speed and a temperature of 195° F.–205° F. (200° F. target). Approximately 22.5 lbs. of water were added through steam injection, resulting in a total batch weight of 112.5 lbs. The spinning knives in the Comminutor and the injected steam comminute the frozen vegetables into a puree that passes through a 3/16" or 1/4" screen. The puree is then twice passed through a Stephan Microcutter, Model No. MC-12, equipped with a 0.05–0.10 mm ring. The resulting vegetable puree is transferred to a holding tank and is sampled for total solids. The term total solids includes the carbohydrate and cellulose contents of the vegetable puree, most of which is insoluble. Technical personnel then calculate the weight of puree to be added in order to deliver 5.7 lbs. of vegetable puree total solids to the batch.

Step Two—Pilot Plant Manufacturing Procedure for the Product. Technical personnel sampled the aforementioned vegetable puree in the holding tank and determined that it had a total solids content of 9.12%. Personnel then make the following calculation: 5.7 lbs. is divided by 0.0912 (total solids content of puree), resulting in 62.5 lbs. of vegetable puree that needs to be added to the batch. Based on this calculation, personnel placed 62.5 lbs. of the aforementioned vegetable puree from the holding tank and 11.3 lbs. of batch water in a Koven Kettle that is capable of holding 300 lbs. of product. The other ingredients are then added in no particular order as follows: 12 lbs. of frozen ground beef; 3.5 lbs. of frozen corn, and 2.7 lbs. of dehydrated 1/4" diced potatoes. Using steam injection, all of the ingredients are cooked in the Koven Kettle at about 212° F. for about 10 minutes. When temperatures exceed 210° F. in the kettle, pressure is developed because it is a sealed pressure vessel. About 2.9 lbs. of water are added to the batch via the steam injection. The product is transferred from the Koven Kettle to a stockpot and weighed. Additional water, if necessary, is added to bring the product weight to 100 lbs. In this case, 5.1 lbs. of water were added to the batch to achieve a total weight of 100 lbs.

The product is first microcut using a Stephan Microcutter, Model No. MC-12, equipped with a 0.75 mm ring; the product is microcut a second time using a 0.05–0.10 mm ring. The product is then strained twice through an orifice having a 0.05" opening. The Beef Dinner Supreme is then placed in glass jars and further processed in a conventional fashion and as further required by 21 C.F.R. §113 et seq "Thermally Processed Low-Acid Foods Packaged in Hermetically Sealed Containers," which is incorporated herein by reference.

Pilot Plant Preparation of Sample PP5531

This version of Beef Dinner Supreme used a formula containing 75% orange carrots and 25% white carrots. The vitamin A analysis was 388% of the Daily Value per serving.

Step One—Pilot Plant Puree Production. Sixty lbs. of frozen orange carrots, 20 lbs. of frozen white carrots, and 10 lbs. of frozen green beans were placed in an Fitzpatrick Comminutor at medium speed and a temperature of 195° F. to 205° F. (200° F. target). Approximately 18.9 lbs. of water were added through steam injection in the Comminutor, resulting in a total batch weight of 108.9 lbs. The puree was thereafter processed in the same manner outlined above concerning Sample PP5530.

Step Two—Pilot Plant Manufacturing Procedures for the Product. Technical personnel sampled the aforementioned vegetable puree in the holding tank and determined that it had a total solids content of 9.13%. Personnel then make the following calculation: 5.7 lbs. is divided by 0.0913 (total solids content of puree), resulting in 62.45 lbs. of vegetable puree that needs to be added to the batch. Based on this calculation, personnel placed 62.45 lbs. of the aforementioned vegetable puree and 11.4 lbs. of batch water in a Koven Kettle that is capable of holding 300 lbs. of product. The other ingredients are then added in no particular order as follows: 12 lbs. of frozen ground beef, 3.5 lbs. of frozen corn and 2.7 lbs. of dehydrated 1/4" diced potatoes. Using steam injection, all of the ingredients are cooked in the Koven Kettle at about 212° F. for 10 minutes. About 4.7 lbs. of water were added to the batch via the steam injection. The product is transferred from the Koven Kettle to a stockpot and weighed. Additional water, if necessary, is added to bring the product weight to 100 lbs. In this case, 3.3 lbs. of water were added to the batch to achieve a total weight of 100 lbs. The product was thereafter processed in the same manner outlined above concerning Sample PP5530.

Pilot Plant Production of Sample PP5532

This sample Beef Dinner Supreme was prepared using a combination of 50% orange carrots and 50% white carrots. The vitamin A analysis was 180% of the Daily Value per serving.

Step One—Pilot Plant Puree Production. Forty lbs. of frozen orange carrots, 40 lbs. of frozen white carrots, and 10 lbs. of frozen green beans were placed in a Fitzpatrick Comminutor at medium speed and a temperature of 195° F. to 205° F. (200° F. target). Approximately 17.45 lbs. of water were added through steam injection, resulting in a total batch weight of 107.45 lbs. The puree was thereafter processed in the same manner outlined above concerning Sample PP5530.

Step Two—Pilot Plant Manufacturing Procedures for the Product. Technical personnel sampled the aforementioned vegetable puree in the holding tank and determined that it had a total solids content of 9.39%. Personnel then make the following calculation: 5.7 lbs. is divided by 0.0939 (total solids content of puree), resulting in 60.7 lbs. of vegetable puree that needs to be added to the batch. Based on this calculation, personnel placed 60.7 lbs. of the aforementioned vegetable puree and 13.1 lbs. of batch water in a Koven Kettle that is capable of holding 300 lbs. of product. The other ingredients are then added in no particular order as follows: 12 lbs. of frozen ground beef, 3.5 lbs. of frozen corn and 2.7 lbs. of dehydrated ¼" diced potatoes. Using steam injection, all of the aforementioned ingredients are cooked in the Koven Kettle at about 212° F. for about 10 minutes. About 4.5 lbs. of water are added to the batch via the steam injection. The product is transferred from the Koven Kettle to a stockpot and weighed. Additional water, if necessary, is added to bring the product weight to 100 lbs. In this case, 3.5 lbs. of water was added to the batch to achieve a total weight of 100 lbs. The product was thereafter processed in the same manner outlined above concerning Sample PP5530.

Pilot Plant Production of Sample PP5533

This sample Beef Dinner Supreme was prepared using a combination of 25% orange carrots and 75% white carrots. The vitamin A analysis was 102% of the Daily Value per serving.

Step One—Pilot Plant Puree Production. Twenty lbs. of frozen orange carrots, 60 lbs. of frozen white carrots, and 10 lbs. of frozen green beans were placed in a Fitzpatrick Comminutor, Model No. D, at medium speed and a temperature of 195° F. to 205° F. (200° F. target). Approximately 13.95 lbs. of water were added through steam injection, resulting in a total batch weight of 103.95 lbs. The puree was thereafter processed in the same manner outlined above concerning Sample PP5530.

Step Two—Pilot Plant Manufacturing Procedures for the Product. Technical personnel sampled the aforementioned vegetable puree in the holding tank and determined that it had a total solids content of 9.39%. Personnel then make the following calculation: 5.7 lbs. is divided by 0.0939 (total solids content of puree), resulting in 60.7 lbs. of vegetable puree that needs to be added to the batch. Based on this calculation, personnel placed 60.7 lbs. of the aforementioned vegetable puree and 13.1 lbs. of batch water in a Koven Kettle that is capable of holding 300 lbs. of product. The other ingredients are then added in no particular order as follows: 12 lbs. of frozen ground beef, 3.5 lbs. of frozen corn and 2.7 lbs. of dehydrated ¼" diced potatoes. Using steam injection, all of the aforementioned ingredients are cooked in the Koven Kettle at about 212° F. for about 10 minutes. About 4.3 lbs. of water are added to the batch via the steam injection. The product is transferred from the Koven Kettle to a stockpot and weighed. Additional water, if necessary, is added to bring the product weight to 100 lbs. In this case, 3.7 lbs. of water was added to the batch to achieve a total weight of 100 lbs. The product was thereafter processed in the same manner outlined above concerning Sample PP5530.

Pilot Plant Production of Sample PP5534

This sample Beef Dinner Supreme was prepared using 100% white carrots. The vitamin A analysis was 3% of the Daily Value per serving.

Step One—Pilot Plant Puree Production. Eighty lbs. of frozen white carrots and 10 lbs. of frozen green beans were placed in a Fitzpatrick Comminutor, Model No. D, at medium speed and a temperature of 195° F. to 205° F. (200° F. target). Approximately 13 lbs. of water were added through steam injection, resulting in a total batch weight of 103 lbs. The puree was thereafter processed in the same manner outlined above concerning Sample PP5530.

Step Two—Pilot Plant Manufacturing Procedures for the Product. Technical personnel sampled the aforementioned vegetable puree in the holding tank and determined that it had a total solids content of 8.97%. Personnel then make the following calculation: 5.7 lbs. is divided by 0.0897 (total solids content of puree), resulting in 63.5 lbs. of vegetable puree that needs to be added to the batch. Based on this calculation, personnel placed 63.5 lbs. of the aforementioned vegetable puree and 10.3 lbs. of batch water in a Koven Kettle that is capable of holding 300 lbs. of product. The other ingredients are then added in no particular order as follows: 12 lbs. of frozen ground beef, 3.5 lbs. of frozen corn and 2.7 lbs. of dehydrated ¼" diced potatoes. Using steam injection, all of the aforementioned ingredients are cooked in the Koven Kettle at about 212° F. for about 10 minutes. About 4.9 lbs. of water are added to the batch via the steam injection. The product is transferred from the Koven Kettle to a stockpot and weighed. Additional water, if necessary, is added to bring the product weight to 100 lbs. In this case, 3.1 lbs. of water were added to the batch to achieve a total weight of 100 lbs. The product was thereafter processed in the same manner outlined above concerning Sample PP5530.

Commercial Production of Beef Dinner Supreme

A Beef Dinner Supreme may be produced on a commercial basis using a 100% white carrot formula as follows:

| Ingredients | Percentage by weight theoretical | Weight/ Batch |
| --- | --- | --- |
| carrots, frozen (adjusted to provide 12% total solids) | 40.0 | 1200 lbs. |
| beef, frozen | 12.0 | 360 lbs. |
| green beans, frozen | 5.0 | 150 lbs. |
| corn, frozen | 3.5 | 105 lbs. |
| potatoes, dehydrated | 2.7 | 80 lbs. |
| batch water, estimated | 16.7 | 502 lbs. |
| water from steam injection, estimated | 20.1 | 603 lbs. |
| | 100% | 3,000 lbs. |

Carrot puree or peeled fresh carrot may be substituted in the above formula for frozen carrots. If carrot puree is substituted, the weight of the carrot puree added to the batch is variable depending on the total solids of the carrot puree.

The following two-step method will be used in commercial production of a 3,000 lbs. batch. First, a vegetable puree is prepared using frozen carrots and frozen green beans. In the second step, the vegetable puree is combined with other ingredients to produce the baby food in commercial quantities.

Step-One Commercial Puree Production.

Twelve hundred lbs. of frozen white carrots and 150 lbs. of frozen green beans are placed in a Fitzpatrick Comminutor, Model No. F-20, at medium speed and a temperature of 200° F.–210° F. (205° F. target). Approximately 270 lbs. of water are added through steam injection. The spinning knives in the Comminutor and the injected steam comminute the frozen vegetables into a puree that passes through a ½" square hole screen. The vegetable puree passes through a trap magnet and is then microcut using a Stephan Microcutter, Model No. 100 or 100 DII, equipped with two 0.2 mm rings. The vegetable puree is pumped into a holding tank to be sampled for total solids and to await batching. A minimum total solids of 7.00% is necessary, however, a target total solids of 9.00%–9.49% is desired.

Step Two—Commercial Manufacturing Procedures for the Product.

The amount of vegetable puree used in commercial production and the amount of batch water varies based on the total solids content in the vegetable puree. The amount of vegetable puree and batch water is selected based on the following adjustment table.

TABLE 3

VEGETABLE PUREE/BATCH WATER ADJUSTMENT TABLE

| Total Solids Vegetable Puree | | Lbs. Vegetable Puree | Lbs. Batch Water |
|---|---|---|---|
| 7.00%–7.49% | (Minimum) | 2152 | 53 |
| 7.50%–7.99% | | 2013 | 192 |
| 8.00%–8.49% | | 1891 | 314 |
| 8.50%–8.99% | | 1782 | 423 |
| 9.00%–9.49% | Target | 1678 | 527 |
| 9.50%–9.99% | | 1600 | 605 |
| 10.00%–10.49% | | 1522 | 683 |
| 10.50%–10.99% | | 1451 | 754 |
| 11.00%–11.49% | | 1387 | 818 |
| 11.50%–12.00% | | 1328 | 877 |

Assuming a total solids content of 9.0%–9.49%, 1,678 lbs. of vegetable puree and 527 lbs. of batch water are placed in a Koven Kettle, having a capacity of 3,000 lbs. of product. The other ingredients are then added in no particular order as follows: 360 lbs. of frozen ground beef, 105 lbs. of frozen corn and 80 lbs of ¼" diced dehydrated potatoes. Using steam injection, all of the ingredients are cooked in a Koven Kettle at about 212° F. for about 10 minutes. Approximately 250 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.050" opening. The Beef Dinner Supreme is then placed in glass jars and further processed in a conventional manner and as required by 21 C.F.R. §113.

EXAMPLE 2

Five different samples of Turkey-Rice Dinner were prepared at the pilot plant and assigned numbers PP5513, PP5514, PP5515, PP5516 and PP5517. These samples had the characteristics shown in Tables 4 and 5 below:

TABLE 4

Turkey-Rice Dinner

| Sample Number | Relative Proportions of | | Beta Carotene ppm | Beta Carotene Expressed As Vit. A % DV/serv. |
|---|---|---|---|---|
| | Orange Carrots | White Carrots | | |
| PP5513 | 100% | 0% | 38.8 | 488% |
| PP5514 | 75% | 25% | 26.5 | 332% |
| PP5515 | 50% | 50% | 17.7 | 222% |
| PP5516 | 25% | 75% | 13.1 | 165% |
| PP5517 | 0% | 100% | 0.2 | 2% |

TABLE 5

Turkey-Rice Dinner
Hunterlab Colormeter Results

| Sample | L | a | b |
|---|---|---|---|
| PP5513 | 53.6 | 11.23 | 31.37 |
| PP5514 | 52.83 | 9.76 | 29.86 |
| PP5515 | 54.16 | 8.16 | 28.58 |
| PP5516 | 53.91 | 7.42 | 26.08 |
| PP5517 | 52.87 | 5.50 | 19.18 |

Pilot Plant Preparation of Sample PP5513

The pilot plant produced these samples on a batch basis, each batch weighing approximately 100 lbs. Pilot plant production of sample number 5513 for a Turkey-Rice Dinner was accomplished using a two step procedure i.e., first, a carrot puree is prepared; second, the carrot puree is combined with other ingredients to produce the Turkey-Rice Dinner. Sample number 5513 used a formula with 100% orange carrots. The vitamin A analysis was 488% of the Daily Value per serving.

Step One—Pilot Plant Puree Production. Seventy-five lbs. of frozen orange carrots were placed in a Fitzpatrick Comminutor, Model No. D, at medium speed and a temperature of 195° F.–205° F. (200° F. target). Approximately 20.5 lbs. of water were added through steam injection, resulting in a total batch weight of 95.5 lbs. The spinning knives in the Comminutor and the injected steam comminute the frozen vegetables into a puree that passes through a 3/16" or ¼" screen. The puree is then twice passed through a Stephan Microcutter, Model No. MC-12, equipped with a 0.05–0.10 mm ring. The resulting puree is transferred to a holding tank and is sampled for total solids. The term total solids includes the carbohydrate and cellulose contents of the vegetable puree, most of which is insoluble. Technical personnel then calculate the weight of puree to be added in order to deliver 6.0 lbs. of puree total solids to the batch.

Step Two—Pilot Plant Manufacturing Procedure for the Product. Technical personnel sampled the aforementioned vegetable puree in the holding tank and determined that it had a total solids content of 9.44%. Personnel then make the following calculation: 6.0 lbs. is divided by 0.0944 (total solids content of puree), resulting in 63.55 lbs. of puree that needs to be added to the batch. Based on this calculation, personnel placed 63.55 lbs. of the aforementioned puree from the holding tank and 15.0 lbs. of batch water in a Koven Kettle that is capable of holding 300 lbs. of product. The other ingredients are then added in no particular order as follows: 10 lbs. of frozen turkey and 3.5 lbs. of medium grain rice. Using steam injection, all of the ingredients are cooked in the Koven Kettle at 215° F.–220° F. for about 20 minutes. When temperatures exceed 210° F. in the kettle, pressure is developed because it is a sealed pressure vessel. About 4.1 lbs. of water are added to the batch via the steam injection. The product is transferred from the Koven Kettle to a stockpot and weighed. Additional water, if necessary, is added to bring the product weight to 100 lbs. In this case, 3.9 lbs. of water were added to the batch to achieve a total weight of 100 lbs.

The product is first microcut using a Stephan Microcutter, Model No. MC-12, equipped with a 0.75 mm ring; the product is microcut a second time using a 0.05–0.10 mm ring. The product is then strained twice through an orifice having a 0.05" opening. The Turkey-Rice Dinner is then placed in glass jars and further processed in a conventional fashion and as further required by 21 C.F.R. §113 et seq "Thermally Processed Low-Acid Foods Packaged in Hermetically Sealed Containers," which is incorporated herein by reference.

Pilot Plant Preparation of Sample PP5514

This version of Turkey-Rice Dinner used a formula containing 75% orange carrots and 25% white carrots. The vitamin A analysis was 332% of the Daily Value per serving.

Step One—Pilot Plant Puree Production. Fifty-six and a quarter lbs. of frozen orange carrots, 18.75 lbs. of frozen white carrots were placed in a Fitzpatrick Comminutor at medium speed and a temperature of 195° F. to 205° F. (200° F. target). Approximately 16 lbs. of water were added through steam injection in the Comminutor, resulting in a total batch weight of 91 lbs. The puree was thereafter processed in the same manner outlined above concerning Sample PP5513.

Step Two—Pilot Plant Manufacturing Procedures for the Product. Technical personnel sampled the aforementioned carrot puree in the holding tank and determined that it had a total solids content of 9.58%. Personnel then make the following calculation: 6.0 lbs. is divided by 0.0958 (total solids content of puree), resulting in 62.65 lbs. of puree that needs to be added to the batch. Based on this calculation, personnel placed 62.65 lbs. of the aforementioned carrot puree and 15.85 lbs. of batch water in a Koven Kettle that is capable of holding 300 lbs. of product. The other ingredients are then added in no particular order as follows: 10 lbs. of frozen turkey, 3.5 lbs. of medium grain rice. Using steam injection, all of the ingredients are cooked in the Koven Kettle at about 215° F. to 220° F. for 20 minutes. About 7.0 lbs. of water were added to the batch via the steam injection. The product is transferred from the Koven Kettle to a stockpot and weighed. Additional water, if necessary, is added to bring the product weight to 100 lbs. In this case, one lb. of water was added to the batch to achieve a total weight of 100 lbs. The product was thereafter processed in the same manner outlined above concerning Sample PP5513.

Pilot Plant Preparation of Sample PP5515

This version of Turkey-Rice Dinner used a formula containing 50% orange carrots and 50% white carrots. The vitamin A analysis was 222% of the Daily Value per serving.

Step One—Pilot Plant Puree Production. Thirty-seven and one-half lbs. of frozen orange carrots and 37.5 lbs. of frozen white carrots were placed in a Fitzpatrick Comminutor at medium speed and a temperature of 195° F. to 205° F. (200° F. target). Approximately 15.7 lbs. of water were added through steam injection in the Comminutor, resulting in a total batch weight of 91 lbs. The puree was thereafter processed in the same manner outlined above concerning Sample PP5513.

Step Two—Pilot Plant Manufacturing Procedures for the Product. Technical personnel sampled the aforementioned carrot puree in the holding tank and determined that it had a total solids content of 9.71%. Personnel then make the following calculation: 6.0 lbs. is divided by 0.0971 (total solids content of puree), resulting in 61.8 lbs. of puree that needs to be added to the batch. Based on this calculation, personnel placed 61.8 lbs. of the aforementioned carrot puree and 16.7 lbs. of batch water in a Koven Kettle that is capable of holding 300 lbs. of product. The other ingredients are then added in no particular order as follows: 10 lbs. of frozen turkey and 3.5 lbs. of medium grain rice. Using steam injection, all of the ingredients are cooked in the Koven Kettle at 215° F. to 220° F. for 20 minutes. About 6.2 lbs. of water were added to the batch via the steam injection. The product is transferred from the Koven Kettle to a stockpot and weighed. Additional water, if necessary, is added to bring the product weight to 100 lbs. In this case, 1.8 lbs. of water was added to the batch to achieve a total weight of 100 lbs. The product was thereafter processed in the same manner outlined above concerning Sample PP5513.

Pilot Plant Preparation of Sample PP5516

This version of Turkey-Rice Dinner used a formula containing 5% orange carrots and 75% white carrots. The vitamin A analysis was 165% of the Daily Value per serving.

Step One—Pilot Plant Puree Production. Eighteen and three quarters lbs. of frozen orange carrots and 56.25 lbs. of frozen white carrots were placed in a Fitzpatrick Comminutor at medium speed and a temperature of 195° F. to 205° F. (200° F. target). Approximately 13.8 lbs. of water were added through steam injection in the Comminutor, resulting in a total batch weight of 88.8 lbs. The puree was thereafter processed in the same manner outlined above concerning Sample PP5513.

Step Two—Pilot Plant Manufacturing Procedures for the Product. Technical personnel sampled the aforementioned puree in the holding tank and determined that it had a total solids content of 9.41%. Personnel then make the following calculation: 6.0 lbs. is divided by 0.0941 (total solids content of puree), resulting in 63.75 lbs. of carrot puree that needs to be added to the batch. Based on this calculation, personnel placed 63.75 lbs. of the aforementioned vegetable puree and 14.75 lbs. of batch water in a Koven Kettle that is capable of holding 300 lbs. of product. The other ingredients are then added in no particular order as follows: 10 lbs. of frozen turkey and 3.5 lbs. of medium grain rice. Using steam injection, all of the ingredients are cooked in the Koven Kettle at 215° F. to 220° F. for 20 minutes. About 7.2 lbs. of water were added to the batch via the steam injection. The product is transferred from the Koven Kettle to a stockpot and weighed. Additional water, if necessary, is added to bring the product weight to 100 lbs. In this case, 0.8 lbs. of water were added to the batch to achieve a total weight of 100 lbs. The product was thereafter processed in the same manner outlined above concerning Sample PP5513.

Pilot Plant Preparation of Sample PP5517

This version of Turkey-Rice Dinner used a formula containing 100% white carrots. The vitamin A analysis was 2% of the Daily Value per serving.

Step One—Pilot Plant Puree Production. Seventy-five lbs. of frozen white carrots were placed in a Fitzpatrick Comminutor at medium speed and a temperature of 195° F. to 205° F. (200° F. target). Approximately 12.1 lbs. of water were added through steam injection in the Comminutor, resulting in a total batch weight of 87.1 lbs. The puree was thereafter processed in the same manner outlined above concerning Sample PP5513.

Step Two—Pilot Plant Manufacturing Procedures for the Product. Technical personnel sampled the aforementioned puree in the holding tank and determined that it had a total solids content of 9.44%. Personnel then make the following calculation: 6.0 lbs. is divided by 0.0944 (total solids content of puree), resulting in 63.55 lbs. of carrot puree that needs to be added to the batch. Based on this calculation, personnel placed 63.55 lbs. of the aforementioned carrot puree and 14.95 lbs. of batch water in a Koven Kettle that is capable of holding 300 lbs. of product. The other ingredients are then added in no particular order as follows: 10 lbs. of frozen turkey and 3.5 lbs. of medium grain rice. Using steam injection, all of the ingredients are cooked in the Koven Kettle at 215° F. to 220° F. for 20 minutes. About 8.2 lbs. of water were added to the batch via the steam injection. The product is transferred from the Koven Kettle to a stockpot and weighed. Additional water, if necessary, is added to bring the product weight to 100 lbs. In this case, no additional water was added to the batch to achieve a total weight of 100 lbs. The product was thereafter processed in the same manner outlined above concerning Sample PP5513.

Commercial Production of Turkey-Rice Dinner With White Carrots

A Turkey-Rice Dinner With White Carrots may be produced on a commercial basis using a 100% white carrot formula as follows:

| Ingredients | Percentage by weight theoretical | Weight/ Batch |
|---|---|---|
| carrots, frozen (adjusted to provide 12% total solids) | 50.00 | 1500 lbs. |
| turkey, frozen | 10.0 | 300 lbs. |
| rice, medium grain | 3.5 | 105 lbs. |
| batch water, estimated | 15.5 | 465 lbs. |
| water from steam injection, estimated | 21.0 | 630 lbs. |
|  | 100% | 3,000 lbs. |

Carrot puree or peeled fresh carrot may be substituted in the above formula for frozen carrots. If carrot puree is substituted, the weight of carrot puree added to the batch is variable, depending on the total solids of the carrot puree.

The following two-step method will be used in commercial production of a 3,000 lbs. batch. First a puree is prepared using frozen carrots. In the second step, the puree is combined with other ingredients to produce the baby food in commercial quantities.

Step One—Commercial Puree Production.

Fifteen hundred lbs of frozen white carrots are placed in a Fitzpatrick Comminutor, Model No. F-20, at medium speed and a temperature of 200° F.–210° F. (205° F. target). Approximately 300 lbs of water are added through steam injection. The spinning knives in the Comminutor and the injected steam comminute the frozen vegetables into a puree that passes through a ½" square hold screen. The vegetable puree passes through a trap magnet and is then microcut using a Stephan Microcutter, Model No. 100 or 100 DII, equipped with two 0.2 mm rings. The vegetable puree is pumped into a holding tank to be sampled for total solids and to await batching. A minimum total solids of 7.50% is necessary, however, a target total solids of 9.00%–9.49% is desired.

Step Two—Commercial Manufacturing Procedures for the Product. The amount of puree used in Commercial production and the amount of batch water varies based on the total solids content in the puree. The amount of vegetable puree and batch water is selected based on the adjustment table listed below.

TABLE 6

CARROT PUREE/BATCH WATER ADJUSTMENT TABLE

| Total Solids Carrot Puree | | Lbs. Carrot Puree | Lbs. Batch Water |
|---|---|---|---|
| 7.50%–7.99% | (Minimum) | 2324 | — |
| 8.00%–8.49% |  | 2250 | 90 |
| 8.50%–8.99% |  | 2118 | 222 |

TABLE 6-continued

CARROT PUREE/BATCH WATER ADJUSTMENT TABLE

| Total Solids Carrot Puree | | Lbs. Carrot Puree | Lbs. Batch Water |
|---|---|---|---|
| 9.00%–9.49% | Target | 2000 | 340 |
| 9.50%–9.99% |  | 1895 | 445 |
| 10.00%–10.49% |  | 1800 | 540 |
| 10.50%–10.99% |  | 1714 | 626 |
| 11.00%–11.49% |  | 1636 | 704 |

Assuming a total solids content of 9.0%–9.49%, 2,000 lbs. of puree and 340 lbs. of batch water are placed in a Koven Kettle, having a capacity of 3,000 lbs. of product. The other ingredients are then added in no particular order as follows: 300 lbs. of frozen turkey and 105 lbs. of medium grain rice. Using steam injection, all of the ingredients are cooked in a Koven Kettle at about 215° F. for about 20 minutes. Approximately 255 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.050" opening. The Turkey-Rice Dinner With White Carrots is then placed in glass jars and further processed in a conventional manner and as required by 21 C.F.R. §113.

In addition to the aforementioned samples that were prepared at the pilot plant with white carrots, another series of eight samples of Turkey-Rice Dinner was prepared using white sweet potatoes and assigned numbers 5308, 5328, 5346, 5347, 5348, 5349, 5350 and 5382. The white sweet potatoes were obtained from growers in North Carolina. Varieties and types tested include "White Delight" and "Jersey Sweets." "Hayman" sweet potatoes are another acceptable cultivar.

TABLE 7

Turkey-Rice Dinner With White Sweet Potatoes

| Sample Number | Relative Proportions of | | | Beta Carotene ppm | Beta Carotene Expressed As Vit. A % DV/serv. |
|---|---|---|---|---|---|
|  | Orange Carrots | White Sweet Potatoes | | | |
| PP5308 | 0 | 100 | (1) | 0.8 | 10 |
| PP5328 | 0 | 100 | (1) | 1.0 | 13 |
| PP5346 | 0 | 100 | (1) | 2.0 | 25 |
| PP5347 | 0 | 100 | (2) | 2.9 | 37 |
| PP5348 | 10 | 90 | (1) | 7.9 | 99 |
| PP5349 | 20 | 80 | (1) | 12.0 | 150 |
| PP5350 | 30 | 70 | (1) | 17.9 | 224 |
| PP5382 | 0 | 100 | (1) | 2.2 | 27 |

(1) White Delight sweet potatoes
(2) Jersey Sweets white sweet potatoes

TABLE 8

Turkey-Rice Dinner
With White Sweet Potatoes
Hunterlab Colormeter Results

| Sample | L | a | b |
| --- | --- | --- | --- |
| PP5308 | 51.59 | 4.31 | 19.02 |
| PP5328 | 47.72 | 6.54 | 20.93 |
| PP5346 | 45.60 | 6.89 | 21.15 |
| PP5347 | 45.93 | 6.74 | 21.73 |
| PP5348 | 43.90 | 7.90 | 23.24 |
| PP5349 | 44.86 | 9.17 | 24.38 |
| PP5350 | 44.44 | 10.53 | 25.35 |
| PP5382 | 44.89 | 6.53 | 20.36 |

Pilot Plant Preparation of Sample PP5308

The pilot plant produced these samples on a batch basis, each batch weighing approximately 100 lbs. Pilot plant production of sample number 5308 for a Turkey-Rice Dinner was accomplished using a two step procedure i.e., first, a white sweet potato puree is prepared; second, the white sweet potato puree is combined with other ingredients to produce the Turkey-Rice Dinner. Sample number PP5308 used a formula with 100% fresh white sweet potatoes. The vitamin A analysis was 10% of the Daily Value per serving.

Step One—Pilot Plant Puree Production. Sixty-nine and a quarter lbs. of fresh white sweet potatoes were placed in a Fitzpatrick Comminutor, Model No. D, at medium speed and a temperature of 200° F.–210° F. (205° F. target). Approximately 7.4 lbs. of water were added through steam injection, resulting in a total batch weight of 76.6 lbs. The spinning knives in the Comminutor and the injected steam comminute the sweet potatoes into a puree that passes through a 3/16" or 1/4" screen. The puree is then twice passed through a Stephan Microcutter, Model No. MC-12, equipped with a 0.05–0.10 mm ring. The resulting puree is transferred to a holding tank and is sampled for total solids. The term total solids includes the carbohydrate and cellulose contents of the vegetable puree, most of which is insoluble. Technical personnel then calculate the weight of puree to be added in order to deliver 14.5 lbs. of puree total solids to the batch.

Step Two—Pilot Plant Manufacturing Procedure for the Product. Technical personnel sampled the aforementioned sweet potato puree in the holding tank and determined that it had a total solids content of 25.86%. Personnel then make the following calculation: 14.5 lbs. is divided by 0.2586 (total solids content of puree), resulting in 56.1 lbs. of puree that needs to be added to the batch. Based on this calculation, personnel placed 56.1 lbs. of the aforementioned puree from the holding tank and 22.4 lbs. of batch water in a Koven Kettle that is capable of holding 300 lbs. of product. The other ingredients are then added in no particular order as follows: 10 lbs. of minced turkey and 3.5 lbs. of medium grain rice. Using steam injection, all of the ingredients are cooked in the Koven Kettle at 210° F. for about 10 minutes. When temperatures exceed 210° F. in the kettle, pressure is developed because it is a sealed pressure vessel. About 8.0 lbs. of water are added to the batch via the steam injection. The product is transferred from the Koven Kettle to a stockpot and weighed. Additional water, if necessary, is added to bring the product weight to 100 lbs. In this case, 8.7 lbs. of water were added to the batch to achieve a total weight of 100 lbs.

The product is first microcut using a Stephan Microcutter, Model No. MC-12, equipped with a 0.75 mm ring; the product is microcut a second time using a 0.75 mm ring. The product is then strained twice through an orifice having a 0.05" opening. The Turkey Rice Dinner is then placed in glass jars and further processed in a conventional fashion and as further required by 21 C.F.R. §113 et seq "Thermally Processed Low-Acid Foods Packaged in Hermetically Sealed Containers," which is incorporated herein by reference. This sample had a thick consistency; however, flavor was good.

Pilot Plant Preparation of Sample PP5328

This version of Turkey-Rice Dinner used a formula containing fresh white sweet potatoes. The vitamin A analysis was 13% of the Daily Value per serving.

Step One—Pilot Plant Puree Production. Fifty lbs. of fresh white sweet potatoes were placed in a Fitzpatrick Comminutor at medium speed and a temperature of 145° F. to 180° F., 180° F. maximum. The puree was thereafter processed in the same manner outlined above concerning Sample PP5308. The amount of puree recovered was 43.6 lbs. The relatively small amount of puree had a particularly thick consistency, leading to its retention in the equipment and piping. This made it impossible to achieve quantitative recovery of all of the puree from the equipment without risking the physical safety of the operator.

Step Two—Pilot Plant Manufacturing Procedures for the Product. Personnel placed 43.6 lbs. of the aforementioned puree and 30.9 lbs. of batch water in a Koven Kettle that is capable of holding 300 lbs. of product. The puree was heated to 170°–185° F. and held for five minutes. The other ingredients are then added in no particular order as follows: 10 lbs. of minced turkey, 3.5 lbs. of medium grain rice. Using steam injection, all of the ingredients are cooked in the Koven Kettle at about 210° F. for 10 minutes. About 9.2 lbs. of water were added to the batch via the steam injection. This product appeared thin after processing in the Koven Kettle. No additional water was added to the batch after the Koven Kettle which weighed 97.20 lbs. The rice was not fully cooked using this procedure. The product was thereafter processed in the same manner outlined above concerning Sample PP5308.

Pilot Plant Preparation of Sample PP5346

This version of Turkey-Rice Dinner used a formula containing fresh white sweet potatoes called "Jersey Sweets." The vitamin A analysis was 25% of the Daily Value per serving.

Step One—Pilot Plant Puree Production. Seventy-five lbs. of fresh white sweet potatoes were placed in a Fitzpatrick Comminutor at medium speed and a temperature of 145° F. to 180° F., maximum 180° F. The puree was thereafter processed in the same manner outlined above concerning Sample PP5308. A total of 72.2 lbs. of sweet potato puree were recovered. The relatively small amount of puree had a particularly thick consistency, leading to its retention in the equipment and piping. This made it impossible to achieve quantitative recovery of all of the puree from the equipment without risking the physical safety of the operator.

Step Two—Pilot Plant Manufacturing Procedures for the Product. Technical personnel sampled the aforementioned sweet potatoes puree in the holding tank and determined that it had a total solids content of 26.57%. Personnel then make the following calculation: 14.0 lbs. is divided by 0.2657 (total solids content of puree), resulting in 52.70 lbs. of puree that needs to be added to the batch. Based on this calculation, personnel placed 52.7 lbs. of the aforementioned puree and 26.80 lbs. of batch water in a Koven Kettle that is capable of holding 300 lbs. of product. The puree was heated in the Koven Kettle to 175° F.–180° F. and held for five minutes. The other ingredients are then added in no particular order as follows: 10 lbs. of minced turkey and 3.5 lbs. of medium grain rice. Using steam injection, all of the ingredients are cooked in the Koven Kettle at 200° F. for 10 minutes. About 9 lbs. of water were added to the batch via the steam injection. The product is transferred from the Koven Kettle to a stockpot. The batch weighed 102.0 lbs. The product was thereafter processed in the same manner outlined above concerning Sample PP5308.

Pilot Plant Preparation of Sample PP5347

This version of Turkey-Rice Dinner used a formula containing fresh White Delight sweet potatoes. The vitamin A analysis was 37% of the Daily Value per serving.

Step One—Pilot Plant Puree Production. Seventy-five lbs. of fresh white sweet potatoes were placed in a Fitzpatrick Comminutor at medium speed and a temperature of 145° F. to 180° F., 180° F. maximum. Approximately 4.6 lbs. of water were added through steam injection in the Comminutor, resulting in a total batch weight of 79.6 lbs. The puree was thereafter processed in the same manner outlined above concerning Sample PP5308.

Step Two—Pilot Plant Manufacturing Procedures for the Product. Technical personnel sampled the aforementioned puree in the holding tank and determined that it had a total solids content of 23.29%. Personnel then make the following calculation: 14.0 lbs. is divided by 0.2329 (total solids content of puree), resulting in 60.1 lbs. of puree that needs to be added to the batch. Based on this calculation, personnel placed 60.1 lbs. of the aforementioned puree and 19.4 lbs. of batch water in a Koven Kettle that is capable of holding 300 lbs. of product. The puree was then heated to 175° F.–180° F. and held for five minutes. The other ingredients are then added in no particular order as follows: 10 lbs. of minced turkey and 3.5 lbs. of medium grain rice. Using steam injection, all of the ingredients are cooked in the Koven Kettle at 200° F. for 10 minutes. About 7.3 lbs. of water were added to the batch via the steam injection. The product is transferred from the Koven Kettle to a stockpot. The batch weighed 100.30 lbs. The product was thereafter processed in the same manner outlined above concerning Sample PP5308.

Pilot Plant Preparation of Sample PP5348

This version of Turkey-Rice Dinner used a formula containing a ratio of 90% fresh White Delight sweet potatoes to 10% frozen orange carrots. The vitamin A analysis was 99% of the Daily Value per serving.

Step One—Pilot Plant Puree Production. Sixty-seven and a half lbs. of fresh white delight sweet potatoes and 7.5 lbs. of frozen orange carrots were placed in a Fitzpatrick Comminutor at medium speed and a temperature of 145° F. to 180° F., 180° F. maximum. The puree was thereafter processed in the same manner outlined above concerning Sample PP5308. A total of 74.6 lbs. of puree were recovered. The relatively small amount of puree had a particularly thick consistency, leading to its retention in the equipment and piping. This made it impossible to achieve quantitative recovery of all of the puree from the equipment without risking the physical safety of the operator.

Step Two—Pilot Plant Manufacturing Procedures for the Product. Technical personnel sampled the aforementioned puree in the holding tank and determined that it had a total solids content of 23.88%. Personnel then make the following calculation: 13.6 lbs. is divided by 0.2388 (total solids content of puree), resulting in 56.95 lbs. of puree that needs to be added to the batch. Based on this calculation, personnel placed 56.95 lbs. of the aforementioned puree and 21.55 lbs. of batch water in a Koven Kettle that is capable of holding 300 lbs. of product. The puree was heated to 175° F.–180° F. and held for five minutes. The other ingredients are then added in no particular order as follows: 8 lbs. of minced turkey and 3.5 lbs. of medium grain rice. Using steam injection, all of the ingredients are cooked in the Koven Kettle at 200° F. for 10 minutes. About 7.9 lbs. of water were added to the batch via the steam injection. The product is transferred from the Koven Kettle to a stockpot and weighed. Additional water, if necessary, is added to bring the product weight to 100 lbs. In this case, 2.10 lbs. of water was added to the batch to achieve a total weight of 100 lbs. The product was thereafter processed in the same manner outlined above concerning Sample PP5308.

Pilot Plant Preparation of Sample PP5349

This version of Turkey-Rice Dinner used a formula containing a ratio of 80% fresh White Delight sweet potatoes and 20% frozen orange carrots. The vitamin A analysis was 150% of the Daily Value per serving.

Step One—Pilot Plant Puree Production. Sixty lbs. of fresh white sweet potatoes and 15 lbs. of frozen orange carrots were placed in a Fitzpatrick Comminutor at medium speed and a temperature of 145° F. to 180° F., 200° F. maximum. Approximately 2.0 lbs. of water were added through steam injection in the Comminutor, resulting in a total batch weight of 77 lbs. The puree was thereafter processed in the same manner outlined above concerning Sample PP5308.

Step Two—Pilot Plant Manufacturing Procedures for the Product. Technical personnel sampled the aforementioned puree in the holding tank and determined that it had a total solids content of 22.22%. Personnel then make the following calculation: 12.8 lbs. is divided by 0.2222 (total solids content of puree), resulting in 57.6 lbs. of puree that needs to be added to the batch. Based on this calculation, personnel placed 57.6 lbs. of the aforementioned puree and 20.9 lbs. of batch water in a Koven Kettle that is capable of holding 300 lbs. of product. The puree is heated to 175° F.–180° F. and held for five minutes. The other ingredients are then added in no particular order as follows: 8 lbs. of minced turkey and 3.5 lbs. of medium grain rice. Using steam injection, all of the ingredients are cooked in the Koven Kettle at 200° F. for 10 minutes. About 6.2 lbs. of water were added to the batch via the steam injection. The product is transferred from the Koven Kettle to a stockpot and weighed. Additional water, if necessary, is added to bring the product weight up to 100 lbs. In this case, 3.80 lbs. of water were added to the batch to achieve a total weight of 100 lbs. The product was thereafter processed in the same manner outlined above concerning Sample PP5308.

Pilot Plant Preparation of Sample PP5350

This version of Turkey-Rice Dinner used a formula containing a ratio of 70% fresh White Delight sweet potatoes and 30% frozen orange carrots. The vitamin A analysis was 224% of the Daily Value per serving.

Step One—Pilot Plant Puree Production. Fifty-two and a half lbs. of fresh white delight sweet potatoes and 22.5 lbs. of frozen orange carrots were placed in a Fitzpatrick Comminutor at medium speed and a temperature of 145° F. to 180° F., 180° F. maximum. A total of 74.30 lbs. of vegetable puree were recovered. The puree was thereafter processed in the same manner outlined above concerning Sample PP5308. The relatively small amount of puree had a particularly thick consistency, leading to its retention in the equipment and piping. This made it impossible to achieve quantitative recovery of all of the puree from the equipment without risking the physical safety of the operator.

Step Two—Pilot Plant Manufacturing Procedures for the Product. Technical personnel sampled the aforementioned puree in the holding tank and determined that it had a total solids content of 19.65%. Personnel then make the following calculation: 11.9 lbs. is divided by 0.1965 (total solids content of puree), resulting in 60.55 lbs. of puree that needs to be added to the batch. Based on this calculation, personnel placed 60.55 lbs. of the aforementioned puree and 17.95 lbs. of batch water in a Koven Kettle that is capable of holding 300 lbs. of product. The puree was heated to 175° F.–180° F. and held for five minutes. The other ingredients are then added in no particular order as follows: 8 lbs. of minced turkey and 3.5 lbs. of medium grain rice. Using steam injection, all of the ingredients are cooked in the Koven Kettle at 200° F. for 10 minutes. About 6.3 lbs. of water were added to the batch via the steam injection. The product is transferred from the Koven Kettle to a stockpot and weighed. Additional water, if necessary, is added to bring the product weight to 100 lbs. In this case, 3.70 lbs. of water was added to the batch to achieve a total weight of 100 lbs. The product was thereafter processed in the same manner outlined above concerning Sample PP5308.

Pilot Plant Preparation of Sample PP5382

This version of Turkey-Rice Dinner used a formula containing fresh white delight sweet potatoes. The vitamin A analysis was 27% of the Daily Value per serving.

Step One—Pilot Plant Puree Production. Seventy-five lbs. of fresh white sweet potatoes were placed in a Fitzpatrick Comminutor at medium speed and a temperature of 145° F. to 180° F., 180° F maximum. Approximately 0.7 lbs. of water were added through steam injection in the Comminutor, resulting in a total batch weight of 75.7 lbs. The puree was thereafter processed in the same manner outlined above concerning Sample PP5308.

Step Two—Pilot Plant Manufacturing Procedures for the Product. Technical personnel sampled the aforementioned puree in the holding tank and determined that it had a total solids content of 23.33%. Personnel then make the following calculation: 14 lbs. is divided by 0.2333 (total solids content of puree), resulting in 60.00 lbs. of puree that needs to be added to the batch. Based on this calculation, personnel placed 60.00 lbs. of the aforementioned puree and 18.5 lbs. of batch water in a Koven Kettle that is capable of holding 300 lbs. of product. The puree was heated to 175° F.–180° F. and held for five minutes. The other ingredients are then added in no particular order as follows: 10 lbs. of minced turkey and 3.5 lbs. of medium grain rice. Using steam injection, all of the ingredients are cooked in the Koven Kettle at 200° F. for 10 minutes. About 7.3 lbs. of water were added to the batch via the steam injection. The product is transferred from the Koven Kettle to a stockpot and weighed. Additional water, if necessary, is added to bring the product weight to 100 lbs. In this case, 0.7 lbs. of water were added to the batch to achieve a total weight of 100 lbs. The product was thereafter processed in the same manner outlined above concerning Sample PP5308.

Commercial Production of Turkey-Rice Dinner with White Sweet Potatoes.

A Turkey-Rice Dinner with White Sweet Potatoes may be produced on a commercial basis using a 100% white sweet potato formula as follows:

| Ingredients | Percentage by weight theoretical | Weight/ Batch |
|---|---|---|
| white sweet potato puree, made from fresh white sweet potatoes | 62.83 | 1885 lbs. |
| turkey, raw, minced | 10.00 | 300 lbs. |
| rice, medium grain | 5.0 | 150 lbs. |
| batch water, estimated | 14.0 | 420 lbs. |
| water from steam injection, estimated | 8.17 | 245 lbs. |
|  | 100% | 3,000 lbs. |

The following two-step method may be used in commercial production of a 3,000 lbs. batch. First, a puree is prepared using fresh white sweet potatoes. In the second step, the puree is combined with other ingredients to produce the baby food in commercial quantities.

Step One—Commercial Puree Production.

The sweet potatoes are cured by holding them at 85° F. and 85–90% relative humidity for 4–7 days. The sweet potatoes pass through a reel washer, destoner, scrubber and another destoner. The washed and scrubbed sweet potatoes pass through a steam peeler and a scrubber where brushes remove the skins which were loosened in the peeler. The sweet potatoes are scrubbed again and fed into a washer. Thereafter the sweet potatoes pass through a rod washer for final washing. The sweet potatoes pass through a Robinson cutter equipped with a one-inch square screen for size reduction.

The white sweet potatoes are placed in a Fitzpatrick Comminutor, Model No. F-20, at medium speed and a temperature of 145° F.–180° F., 180° F. maximum. Approximately 25 lbs. of water are added through steam injection for each 100 lbs. of fresh peeled sweet potatoes. The spinning knives in the Comminutor and the injected steam comminute the sweet potatoes into a puree that passes through a ½" square hole screen. The puree passes through a trap magnet and is then microcut using a Stephan Microcutter, Model No. 100 or 100 DII, equipped with two 0.9 mm/0.2 mm rings. The puree is pumped into a holding tank to await batching.

Step Two—Commercial Manufacturing Procedures for the Product.

Carrots are available and are commonly utilized in fresh peeled as well as frozen form. Moreover, frozen carrots are available in variously sized pieces; smaller pieces carry more frozen water and thus can differ substantially in their proportions of total solids. For these reasons, the total solids of purees wholly or partially comprised of carrots is a critical determinant of finished product consistency. Consequently, the total solids measurement is used to determine batch composition.

In contrast, sweet potatoes can only be used in the fresh condition and must undergo controlled conversion of a portion of the starch to avoid starch separation. These two disadvantages of sweet potatoes have been described heretofore. However, since the nature of the sweet potato raw material and its conversion process are so tightly defined, a benefit accrues in that converted sweet potato puree is much less variable than a puree wholly or partially comprised of carrots. This lesser variability can be exploited in the production environment and both time and effort can be saved by metering a set weight of converted sweet potato puree.

One thousand eight hundred and eighty-five lbs. of puree and 420 lbs. of batch water are placed in a Koven Kettle, having a capacity of 3,000 lbs. of product. The other ingredients are then added in no particular order as follows:

300 lbs. of minced turkey and 150 lbs of medium grain rice. Using steam injection, all of the ingredients are cooked in a Koven Kettle at about 215° F.–220° F. for about 20 minutes. Approximately 245 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.050" opening. The Turkey-Rice Dinner is then placed in glass jars and further processed in a conventional manner and as required by 21 C.F.R. §113.

Product so produced had a Beta-carotene content equivalent to 26% of the Daily Value of vitamin A per serving, and the following Hunterlab colormeter results: L=46.51; a=9.60; and b=28.39.

EXAMPLE 3

Five different samples of Macaroni & Beef Dinner were prepared at the pilot plant, and were assigned numbers PP5524, PP5525, PP5526, PP5527 and PP5528. These samples had the characteristics shown in Tables 9 and 10 below.

TABLE 9

Macaroni & Beef Dinner

| Sample Number | Relative Proportions of | | Beta Carotene ppm | Beta Carotene Expressed As Vit. A % DV/serv. |
|---|---|---|---|---|
| | Orange Carrots | White Carrots | | |
| PP5524 | 100% | 0% | 31.1 | 390% |
| PP5525 | 75% | 25% | 20.7 | 260% |
| PP5526 | 50% | 50% | 14.0 | 176% |
| PP5527 | 25% | 75% | 8.8 | 111% |
| PP5528 | 0% | 100% | 1.0 | 12% |

TABLE 10

Macaroni & Beef Dinner
Hunterlab Colormeter Results

| Sample | L | a | b |
|---|---|---|---|
| PP5524 | 49.37 | 19.66 | 31.19 |
| PP5525 | 49.2 | 18.72 | 30.54 |
| PP5526 | 49.93 | 17.63 | 30.17 |
| PP5527 | 47.36 | 16.33 | 27.45 |
| PP5528 | 48.96 | 16.44 | 25.81 |

Pilot Plant Preparation of Sample PP5524

The pilot plant produced these samples on a batch basis, each batch weighing approximately 100 lbs. The pilot plant procedures are designed to mimic commercial scale production. However, the two procedures are not identical. Commercial production will also be done on a batch basis, each batch ordinarily weighing approximately 3,000 lbs. The procedures for commercial production will be discussed in greater detail below.

Pilot plant production of sample number 5524 for a Macaroni & Beef Dinner was accomplished using a two step procedure, i.e., first, a vegetable puree containing carrots and peas is prepared; second, the vegetable puree is combined with other ingredients to produce the Macaroni & Beef Dinner. Sample number 5524 used a formula with 100% orange carrots. The vitamin A analysis was 390% of the Daily Value per serving.

Step One—Pilot Plant Puree Production. Seventy-two lbs. of frozen orange carrots and 3 lbs. of frozen peas were placed in a Fitzpatrick Comminutor, Model No. D, at medium speed and a temperature of 195° F.–205° F. (200° F. target). Approximately 17.90 lbs. of water were added through steam injection, resulting in a total batch weight of 92.90 lbs. The spinning knives in the Comminutor and the injected steam comminute the frozen vegetables into a puree that passes through a 3/16" or 1/4" screen. The puree is then twice passed through a Stephan Microcutter, Model No. MC-12, equipped with a 0.05–0.10 mm ring. The resulting vegetable puree is transferred to a holding tank and is sampled for total solids. The term total solids includes the carbohydrate and cellulose contents of the vegetable puree, most of which is insoluble. Technical personnel then calculate the weight of puree to be added in order to deliver 5.8 lbs. of vegetable puree total solids to the batch.

Step Two—Pilot Plant Manufacturing Procedures for the Product. Technical personnel sampled the aforementioned puree in the holding tank and determined that it had a total solids content of 9.64%. Personnel then make the following calculation: 5.8 lbs. is divided by 0.0964 (total solids content of puree), resulting in 60.15 lbs. of vegetable puree that needs to be added to the batch. Based on this calculation, personnel placed 60.15 lbs. of the aforementioned vegetable and 10.85 lbs. of batch water in a Koven Kettle that is capable of holding 300 lbs. of product. The other ingredients are then added in no particular order as follows: 8 lbs. of frozen ground beef; 4 lbs. of macaroni rings; and 9 lbs. of tomato puree (12% total solids in the tomato puree.) Using steam injection, all of the ingredients are cooked in the Koven Kettle at about 212° F. for 10 minutes. When temperatures exceed 210° F. in the kettle, pressure is developed because it is a sealed pressure vessel. About 2.5 lbs. of water were added to the batch via the steam injection. The product is transferred from the Koven Kettle to a stockpot and weighed. Additional water, if necessary, is added to bring the product weight to 100 lbs. In this case, 5.5 lbs. of water were added to the batch to achieve a total weight of 100 lbs.

The product is then microcut using a Stephan Microcutter, Model No. MC-12, equipped with a 0.75 mm ring; the product is microcut a second time using a 0.05–0.10 mm ring. The product is then strained twice through an orifice having a 0.05" opening. The Macaroni & Beef Dinner is then placed in glass jars and further processed in a conventional manner and as required by 21 C.F.R. §3.

Pilot Plant Preparation of Sample PP5525

This version of Macaroni & Beef Dinner used a formula containing 75% orange carrots and 25% white carrots. The vitamin A analysis was 260% of the Daily Value per serving.

Step One—Pilot Plant Puree Production. Fifty-four lbs. of frozen orange carrots, 18 lbs. of frozen white carrots, and 3 lbs. of frozen green beans were placed in a Fitzpatrick Comminutor, Model No. D, at medium speed and a temperature of 195° F.–205° F. (200° F. target). Approximately 15.3 lbs. of water were added through steam injection, resulting in a total batch weight of 90.3 lbs. The puree was thereafter processed in the same manner outlined above concerning Sample PP5524.

Step Two—Pilot Plant Manufacturing Procedures for the Product. Technical personnel sampled the aforementioned vegetable puree in the holding tank and determined that it had a total solids content of 9.84%. Personnel then make the following calculation: 5.8 lbs. is divided by 0.0984 (total solids content of puree), resulting in 58.95 lbs. of vegetable puree that needs to be added to the batch. Based on this calculation, personnel placed 58.95 lbs. of the aforementioned vegetable puree and 12.05 lbs. of batch water in a Koven Kettle that is capable of holding 300 lbs. of product. The other ingredients are then added in no particular order as follows: 8 lbs. of frozen ground beef; 4 lbs. of macaroni rings; and 9 lbs. of tomato puree. Using steam injection, all of the ingredients are cooked in the Koven Kettle at about 212° F. for 10 minutes. About 6.0 lbs. of water were added to the batch via the steam injection. The product is transferred from the Koven Kettle to a stockpot and weighed. Additional water, if necessary, is added to bring the product weight to 100 lbs. In this case, 2 lbs. of water were added to the batch to achieve a total weight of 100 lbs. The product was thereafter processed in the same manner outlined above concerning Sample PP5524.

Pilot Plant Preparation of Sample PP5526

This version of Macaroni & Beef Dinner used a formula containing 50% orange carrots and 50% white carrots. The vitamin A analysis was 176% of the Daily Value per serving.

Step One—Pilot Plant Puree Production. Thirty-six lbs. of frozen orange carrots, 36 lbs. of frozen white carrots, and 3 lbs. of frozen peas were placed in a Fitzpatrick Comminutor at medium speed and a temperature of 195° F.–205° F. (200° F. target). Approximately 14 lbs. of water were added through steam injection, resulting in a total batch weight of 89 lbs. The puree was thereafter processed in the same manner outlined above concerning Sample PP5524.

Step Two—Pilot Plant Manufacturing Procedures for the Product. Technical personnel sampled the aforementioned vegetable puree in the holding tank and determined that it had a total solids content of 10.07%. Personnel then make the following calculation: 5.8 lbs. is divided by 0.1007 (total solids content of puree), resulting in 57.60 lbs. of vegetable puree that needs to be added to the batch. Based on this calculation, personnel placed 57.60 lbs. of the aforementioned vegetable puree and 13.4 lbs. of batch water in a Koven Kettle that is capable of holding 300 lbs. of product. The other ingredients are then added in no particular order as follows: 8 lbs. of frozen ground beef; 4 lbs. of macaroni rings; and 9 lbs. of tomato puree. Using steam injection, all of the ingredients are cooked in the Koven Kettle at about 212° F. for 10 minutes. About 4.2 lbs. of water were added to the batch via the steam injection. The product is transferred from the Koven Kettle to a stockpot and weighed. Additional water, if necessary, is added to bring the product weight to 100 lbs. In this case, 3.8 lbs. of water were added to the batch to achieve a total weight of 100 lbs. The product was thereafter processed in the same manner outlined above concerning Sample PP5524.

Pilot Plant Preparation of Sample PP5527

This version of Macaroni & Beef Dinner used a formula containing 25% orange carrots and 75% white carrots. The vitamin A analysis was 111% of the Daily Value per serving.

Step One—Pilot Plant Puree Production. Eighteen lbs. of frozen orange carrots, 54 lbs. of frozen white carrots, and 3 lbs. of frozen peas were placed in a Fitzpatrick Comminutor at medium speed and a temperature of 195° F.–205° F. (200° F. target). Approximately 12.4 lbs. of water were added through steam injection, resulting in a total batch weight of 87.4 lbs. The puree was thereafter processed in the same manner outlined above concerning Sample PP5524.

Step Two—Pilot Plant Manufacturing Procedures for the Product. Technical personnel sampled the aforementioned vegetable puree in the holding tank and determined that it had a total solids content of 10.10%. Personnel then make the following calculation: 5.8 lbs. is divided by 0.1010 (total solids content of puree), resulting in 57.45 lbs. of vegetable puree that needs to be added to the batch. Based on this calculation, personnel placed 57.45 lbs. of the aforementioned vegetable puree and 13.55 lbs. of batch water in a Koven Kettle that is capable of holding 300 lbs. of product. The other ingredients are then added in no particular order as follows: 8 lbs. of frozen ground beef; 4 lbs. of macaroni rings; and 9 lbs. of tomato puree. Using steam injection, all of the ingredients are cooked in the Koven Kettle at about 212° F. for 10 minutes. About 7.6 lbs. of water were added to the batch via the steam injection. The product is transferred from the Koven Kettle to a stockpot and weighed. Additional water, if necessary, is added to bring the product weight to 100 lbs. In this case, 0.4 lbs. of water were added to the batch to achieve a total weight of 100 lbs. The product was thereafter processed in the same manner outlined above concerning Sample PP5524.

Pilot Plant Preparation of Sample PP5528

This version of Macaroni & Beef Dinner used a formula containing 100% white carrots. The vitamin A analysis was 12% of the Daily Value per serving.

Step One—Pilot Plant Puree Production. Seventy-two lbs. of frozen white carrots and 3 lbs. of frozen peas were placed in a Fitzpatrick Comminutor at medium speed and a temperature of 195° F.–205° F. (200° F. target). Approximately 10 lbs. of water were added through steam injection, resulting in a total batch weight of 85 lbs. The puree was thereafter processed in the same manner outlined above concerning Sample PP5524.

Step Two—Pilot Plant Manufacturing Procedures for the Product. Technical personnel sampled the aforementioned vegetable puree in the holding tank and determined that it had a total solids content of 9.51%. Personnel then make the following calculation: 5.8 lbs. is divided by 0.0951 (total solids content of puree), resulting in 61.0 lbs. of vegetable puree that needs to be added to the batch. Based on this calculation, personnel placed 61.0 lbs. of the aforementioned vegetable puree and 10.0 lbs. of batch water in a Koven Kettle that is capable of holding 300 lbs. of product. The other ingredients are then added in no particular order as follows: 8 lbs. of frozen ground beef; 4 lbs. of macaroni rings; and 9 lbs. of tomato puree. Using steam injection, all of the ingredients are cooked in the Koven Kettle at about 212° F. for 10 minutes. About 7.1 lbs. of water were added to the batch via the steam injection. The product is transferred from the Koven Kettle to a stockpot and weighed. Additional water, if necessary, is added to bring the product weight to 100 lbs. In this case, 0.9 lbs. of water were added to the batch to achieve a total weight of 100 lbs. The product was thereafter processed in the same manner outlined above concerning Sample PP5524.

Commercial Production of Macaroni & Beef Dinner

A Macaroni & Beef Dinner may be produced on a commercial basis using a 100% white carrot formula as follows:

| Ingredients | Percentage by weight theoretical | Weight/ Batch |
| --- | --- | --- |
| carrots, frozen (adjusted to provide 12% total solids) | 45.0 | 1350 lbs. |
| beef, frozen | 8.0 | 240 lbs. |
| macaroni rings | 4.0 | 120 lbs. |
| tomato paste, | 3.48 | 104 lbs. |

-continued

| Ingredients | Percentage by weight theoretical | Weight/ Batch |
|---|---|---|
| 31% total solids | | |
| peas, frozen | 2.0 | 60 lbs. |
| batch water, estimated | 19.59 | 588 lbs. |
| water from steam injection, estimated | 17.93 | 538 lbs. |
| | 100% | 3,000 lbs. |

Mixed vegetable puree may be substituted for frozen carrots and peas. If mixed vegetable puree is substituted for frozen carrots and frozen peas, the weight of mixed vegetable puree added to the batch is variable, depending on the total solids of the mixed vegetable puree.

The following two-step method will be used in commercial production of a 3,000 lbs. batch. First, a vegetable puree is prepared using frozen carrots and frozen peas. In the second step, the vegetable puree is combined with other ingredients to produce the baby food in commercial quantities.

Step One—Commercial Puree Production.

Thirteen hundred and fifty lbs. of frozen white carrots and 60 lbs. of frozen peas are placed in a Fitzpatrick Comminutor, Model No. F-20, at medium speed and a temperature of 200° F.–210° F. (205° F. target). Approximately 280 lbs. of water are added through steam injection. The spinning knives in the Comminutor and the injected steam comminute the frozen vegetables into a puree that passes through a ½" square hole screen. The vegetable puree passes through a trap magnet and is then microcut using a Stephan Microcutter, Model No. 100 or 100 DII, equipped with two 0.2 mm rings. The vegetable puree is pumped into a holding tank to be sampled for total solids and to await batching. A minimum total solids of 7.50% is necessary, however, a target total solids of 9.00%–9.49% is desired.

Step Two—Commercial Manufacturing Procedures for the Product. The amount of puree used in commercial production and the amount of batch water varies based on the total solids content in the puree. The amount of vegetable puree and batch water is selected based on the adjustment table.

TABLE 11

VEGETABLE PUREE/BATCH WATER ADJUSTMENT TABLE

| Total Solids Vegetable Puree | | Lbs. Vegetable Puree | Lbs. Batch Water |
|---|---|---|---|
| 7.50%–7.99% | (Minimum) | 2171 | — |
| 8.00%–8.49% | | 2045 | 126 |
| 8.50%–8.99% | | 1924 | 247 |
| 9.00%–9.49% | Target | 1817 | 354 |
| 9.50%–9.99% | | 1722 | 449 |
| 10.00%–10.49% | | 1636 | 535 |
| 10.50%–10.99% | | 1558 | 613 |
| 11.00%–11.49% | | 1487 | 684 |
| 11.50%–12.00% | | 1422 | 749 |

Assuming a total solids content of 9.0%–9.49%, 1,817 lbs. of puree and 354 lbs. of batch water are placed in a Koven Kettle, having a capacity of 3,000 lbs. of product. The other ingredients are then added in no particular order as follows: 240 lbs. of frozen ground beef, 120 lbs. of macaroni rings and 104 lbs. of tomato paste. Using steam injection, all of the ingredients are cooked in a Koven Kettle at about 212° F. for about 10 minutes. Approximately 200 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.050" opening. The Turkey-Rice Dinner is then placed in glass jars and further processed in a conventional manner and as required by 21 C.F.R. §113.

EXAMPLE 4

Five different samples of Vegetable-Beef Dinner were prepared at the pilot plant and were assigned numbers PP5518, PP5519, PP5520, PP5521 and PP5522. These samples had the characteristics shown in Tables 12 and 13 below.

TABLE 12

Vegetable-Beef Dinner

| Sample Number | Relative Proportions of | | Beta Carotene ppm | Beta Carotene Expressed As Vit. A % DV/serv. |
|---|---|---|---|---|
| | Orange Carrots | White Carrots | | |
| PP5518 | 100% | 0% | 27.4 | 344% |
| PP5519 | 75% | 25% | 18.9 | 237% |
| PP5520 | 50% | 50% | 9.4 | 118% |
| PP5521 | 25% | 75% | 4.5 | 56% |
| PP5522 | 0% | 100% | 0.1 | 2% |

TABLE 13

Vegetable-Beef Dinner
Hunterlab Colormeter Results

| Sample | L | a | b |
|---|---|---|---|
| PP5518 | 54.2 | 10.03 | 33.61 |
| PP5519 | 53.43 | 8.56 | 32.11 |
| PP5520 | 54.08 | 6.82 | 30.30 |
| PP5521 | 55.67 | 5.61 | 28.96 |
| PP5522 | 58.1 | 1.93 | 22.12 |

Pilot Plant Preparation of Sample PP5518

The pilot plant produced these samples on a batch basis, each batch weighing approximately 100 lbs. Pilot plant production of sample number 5518 for a Vegetable-Beef Dinner was accomplished using a two step procedure, i.e., first, a vegetable puree containing carrots and peas is prepared; second, the vegetable puree is combined with other ingredients to produce the Vegetable-Beef Dinner. Sample number 5518 used a formula with 100% orange carrots. The vitamin A analysis was 344% of the Daily Value per serving.

Step One—Pilot Plant Puree Production. Seventy lbs. of frozen orange carrots and 10 lbs. of frozen peas were placed in a Fitzpatrick Comminutor, Model No. D, at medium speed and a temperature of 195° F.–205° F. (200° F. target). Approximately 19.15 lbs. of water were added through steam injection, resulting in a total batch weight of 99.15 lbs. The spinning knives in the Comminutor and the injected steam comminute the frozen vegetables into a puree that passes through a 3/16" or ¼" screen. The puree is then twice passed through a Stephan Microcutter, Model No. MC-12, equipped with a 0.05–0.10 mm ring. The resulting vegetable puree is transferred to a holding tank and is sampled for total solids. The term total solids includes the carbohydrate and cellulose contents of the vegetable puree, most of which is insoluble. Technical personnel then calculate the weight of puree to be added in order to deliver 5.1 lbs. of vegetable puree total solids to the batch.

Step Two—Pilot Plant Manufacturing Procedure for the Product. Technical personnel sampled the aforementioned vegetable puree in the holding tank and determined that it had a total solids content of 10.75%. Personnel then make the following calculation: 5.1 lbs. is divided by 0.1075 (total solids content of puree), resulting in 47.45 lbs. of vegetable puree that needs to be added to the batch. Based on this calculation, personnel placed 47.45 lbs. of the aforementioned vegetable puree from the holding tank and 32.55 lbs. of batch water in a Koven Kettle that is capable of holding 300 lbs. of product. The other ingredients are then added in no particular order as follows: 8 lbs. of frozen ground beef and 4 lbs. of dehydrated ¼" diced potatoes. Using steam injection, all of the ingredients are cooked in the Koven Kettle at about 212° F. for about 10 minutes. When temperatures exceed 210° F. in the kettle, pressure is developed because it is a sealed pressure vessel. About 7.0 lbs. of water was added to the batch via the steam injection. The product is transferred from the Koven Kettle to a stockpot and weighed. Additional water, if necessary, is added to bring the product weight to 100 lbs. In this case, one lb. of water was added to the batch to achieve a total weight of 100 lbs.

The product is first microcut using a Stephan Microcutter, Model No. MC-12, equipped with a 0.75 mm ring; the product is microcut a second time using a 0.5–0.10 mm ring. The product is then strained twice through an orifice having a 0.05" opening. The Vegetable-Beef Dinner is then placed in glass jars and further processed in a conventional fashion and as further required by 21 C.F.R. §113 et seq "Thermally Processed Low-Acid Foods Packaged in Hermetically Sealed Containers," which is incorporated herein by reference.

Pilot Plant Preparation of Sample PP5519

This version of Vegetable-Beef Dinner used a formula containing 75% orange carrots and 25% white carrots. The vitamin A analysis was 237% of the Daily Value per serving.

Step One—Pilot Plant Puree Production. Fifty-two and one half lbs. of frozen orange carrots, 17.5 lbs. of frozen white carrots, and 10 lbs. of frozen peas were placed in a Fitzpatrick Comminutor, Model No. D, at medium speed and a temperature of 195° F. to 205° F. (200° F. target). Approximately 16.4 lbs. of water were added through steam injection in the Comminutor, resulting in a total batch weight of 96.4 lbs. The puree was thereafter processed in the same manner outlined above concerning Sample PP5518.

Step Two—Pilot Plant Manufacturing Procedures for the Product. Technical personnel sampled the aforementioned vegetable puree in the holding tank and determined that it had a total solids content of 10.97%. Personnel then make the following calculation: 5.1 lbs. is divided by 0.1097 (total solids content of puree), resulting in 46.5 lbs. of vegetable puree that needs to be added to the batch. Based on this calculation, personnel placed 46.5 lbs. of the aforementioned vegetable puree and 33.5 lbs. of batch water in a Koven Kettle that is capable of holding 300 lbs. of product. The other ingredients are then added in no particular order as follows: 8 lbs. of frozen ground beef and 4 lbs. of dehydrated ¼" diced potatoes. Using steam injection, all of the ingredients are cooked in the Koven Kettle at about 212° F. for 10 minutes. About 7.8 lbs. of water were added to the batch via the steam injection. The product is transferred from the Koven Kettle to a stockpot and weighed. Additional water, if necessary, is added to bring the product weight to 100 lbs. In this case, 0.2 lbs. of water were added to the batch to achieve a total weight of 100 lbs. The product was thereafter processed in the same manner outlined above concerning Sample PP5518.

Pilot Plant Preparation of Sample PP5520

This version of Vegetable-Beef Dinner used a formula containing 50% orange carrots and 50% white carrots. The vitamin A analysis was 118% of the Daily Value per serving.

Step One—Pilot Plant Puree Production. Thirty-five lbs. of frozen orange carrots, 35 lbs. of frozen white carrots, and 10 lbs. of frozen peas were placed in a Fitzpatrick Comminutor, Model No. D, at medium speed and a temperature of 195° F. to 205° F. (200° F. target). Approximately 16.5 lbs. of water were added through steam injection in the Comminutor, resulting in a total batch weight of 96.5 lbs. The puree was thereafter processed in the same manner outlined above concerning Sample PP5518.

Step Two—Pilot Plant Manufacturing Procedures for the Product. Technical personnel sampled the aforementioned vegetable puree in the holding tank and determined that it had a total solids content of 11.7%. Personnel then make the following calculation: 5.1 lbs. is divided by 0.117 (total solids content of puree), resulting in 43.6 lbs. of vegetable puree that needs to be added to the batch. Based on this calculation, personnel placed 43.6 lbs. of the aforementioned vegetable puree and 36.4 lbs. of batch water in a Koven Kettle that is capable of holding 300 lbs. of product. The other ingredients are then added in no particular order as follows: 8 lbs. of frozen ground beef and 4 lbs. of dehydrated ¼" diced potatoes. Using steam injection, all of the ingredients are cooked in the Koven Kettle at about 212° F. for 10 minutes. About 7.2 lbs. of water were added to the batch via the steam injection. The product is transferred from the Koven Kettle to a stockpot and weighed. Additional water, if necessary, is added to bring the product weight to 100 lbs. In this case, 0.8 lbs. of water were added to the batch to achieve a total weight of 100 lbs. The product was thereafter processed in the same manner outlined above concerning Sample PP5518.

Pilot Plant Production of Sample PP5521

This version of Vegetable-Beef Dinner used a formula containing 25% orange carrots and 75% white carrots. The vitamin A analysis was 56% of the Daily Value per serving.

Step One—Pilot Plant Puree Production. Seventeen and a half lbs. of frozen orange carrots, 52.5 lbs. of frozen white carrots and 10 lbs. of frozen peas were placed in a Fitzpatrick Comminutor, Model No. D, at medium speed and a temperature of 195° F. to 205° F. (200° F. target). Approximately 13.6 lbs. of water were added through steam injection, resulting in a total batch weight of 93.6 lbs. The puree was thereafter processed in the same manner outlined above concerning Sample PP5518.

Step Two—Pilot Plant Manufacturing Procedures for the Product. Technical personnel sampled the aforementioned vegetable puree in the holding tank and determined that it had a total solids content of 10.65%. Personnel then make the following calculation: 5.1 lbs. is divided by 0.1065 (total solids content of puree), resulting in 47.9 lbs. of vegetable puree that needs to be added to the batch. Based on this calculation, personnel placed 47.9 lbs. of the aforementioned vegetable puree and 32.1 lbs. of batch water in a Koven Kettle that is capable of holding 300 lbs. of product. The other ingredients are then added in no particular order as follows: 8 lbs. of frozen ground beef and 4 lbs. of dehydrated ¼" diced potatoes. Using steam injection, all of the aforementioned ingredients are cooked in the Koven Kettle at about 212° F. for about 10 minutes. About 6.7 lbs. of water are added to the batch via the steam injection. The product is transferred from the Koven Kettle to a stockpot and weighed. Additional water, if necessary, is added to bring the product weight to 100 lbs. In this case, 1.3 lbs. of water was added to the batch to achieve a total weight of 100 lbs. The product was thereafter processed in the same manner outlined above concerning Sample PP5518.

Pilot Plant Production of Sample PP5522

This version of Vegetable-Beef Dinner used a formula containing 100% white carrots. The vitamin A analysis was 2% of the Daily Value per serving.

Step One—Pilot Plant Puree Production. Seventy lbs. of frozen white carrots and 10 lbs. of frozen peas were placed in a Fitzpatrick Comminutor, Model No. D, at medium speed and a temperature of 195° F. to 205° F. (200° F. target). Due to losses of puree in the Comminutor and associated piping which could not be recovered without endangering employee safety, only 75.7 lbs. of puree were recovered. The puree was thereafter processed in the same manner outlined above concerning Sample PP5518.

Step Two—Pilot Plant Manufacturing Procedures for the Product. Technical personnel sampled the aforementioned vegetable puree in the holding tank and determined that it had a total solids content of 10.89%. Personnel then make the following calculation: 5.1 lbs. is divided by 0.1089 (total solids content of puree), resulting in 46.9 lbs. of vegetable puree that needs to be added to the batch. Based on this calculation, personnel placed 46.9 lbs. of the aforementioned vegetable puree and 33.10 lbs. of batch water in a Koven Kettle that is capable of holding 300 lbs. of product. The other ingredients are then added in no particular order as follows: 8 lbs. of frozen ground beef and 4 lbs. of dehydrated ¼" diced potatoes. Using steam injection, all of the aforementioned ingredients are cooked in the Koven Kettle at about 212° F. for about 10 minutes. About 9.1 lbs. of water were added to the batch via the steam injection. The product is transferred from the Koven Kettle to a stockpot and weighed. This batch weighed 101.1 lbs. and no more water was added. The product was thereafter processed in the same manner outlined above concerning Sample PP5518.

Commercial Production of Vegetable-Beef Dinner

A Vegetable-Beef Dinner may be produced on a commercial basis using a 100% white carrot formula as follows:

| Ingredients | Percentage by weight theoretical | Weight/ Batch |
| --- | --- | --- |
| carrots, frozen (adjusted to provide 12% total solids) | 35.0 | 1050 lbs. |
| beef, frozen | 8.0 | 240 lbs. |
| peas | 5.0 | 150 lbs. |
| potatoes, dehydrated | 4.0 | 120 lbs. |
| batch water, estimated | 33.0 | 990 lbs. |
| water from steam injection, estimated | 15.0 | 450 lbs. |
| | 100% | 3,000 lbs. |

Carrot puree or peeled fresh carrot can be substituted in the above formula for frozen carrots. If carrot puree is substituted for frozen carrots, the weight of carrot puree added to the batch is variable, depending on the total solids of the carrot puree.

The following two-step method will be used in commercial production of a 3,000 lbs. batch. First, a vegetable puree is prepared using frozen carrots and frozen peas. In the second step, the vegetable puree is combined with other ingredients to produce the baby food in commercial quantities.

Step One—Commercial Puree Production.

One thousand and fifty lbs. of frozen white carrots and 150 lbs. of frozen peas are placed in a Fitzpatrick Comminutor, Model No. F-20, at medium speed and a temperature of 200° F.–210° F. (205° F. target). Approximately 240 lbs. of water are added through steam injection. The spinning knives in the Comminutor and the injected steam comminute the frozen vegetables into a puree that passes through a ½" square hole screen. The vegetable puree passes through a trap magnet and is then microcut using a Stephan Microcutter, Model No. 100 or 100 DII, equipped with two 0.2 mm rings. The vegetable puree is pumped into a holding tank to be sampled for total solids and to await batching. A minimum total solids of 6.50% is necessary, however, a target total solids of 9.00%–9.49% is desired.

Step Two—Commercial Manufacturing Procedures for the Product. The amount of vegetable puree used in commercial production and the amount of batch water varies based on the total solids content in the vegetable puree. The amount of vegetable puree and batch water is selected based on the following adjustment table.

TABLE 14

VEGETABLE PUREE/BATCH WATER ADJUSTMENT TABLE

| Total Solids Vegetable Puree | | Lbs. Vegetable Puree | Lbs. Batch Water |
| --- | --- | --- | --- |
| 6.50%–6.99% | (Minimum) | 2326 | 132 |
| 7.00%–7.49% | | 2160 | 298 |
| 7.50%–7.99% | | 2016 | 442 |
| 8.00%–8.49% | | 1890 | 568 |
| 8.50%–8.99% | | 1778 | 680 |
| 9.00%–9.49% | Target | 1680 | 778 |
| 9.50%–9.99% | | 1592 | 866 |
| 10.00%–10.49% | | 1512 | 946 |
| 10.50%–10.99% | | 1440 | 1018 |
| 11.00%–11.49% | | 1375 | 1083 |
| 11.50%–12.00% | | 1315 | 1143 |

Assuming a total solids content of 9.0%–9.49%, 1,680 lbs. of puree and 778 lbs. of batch water are placed in a Koven Kettle, having a capacity of 3,000 lbs. of product. The other ingredients are then added in no particular order as follows: 240 lbs. of frozen ground beef and 120 lbs of ¼" diced dehydrated potatoes. Using steam injection, all of the ingredients are cooked in a Koven Kettle at about 212° F. for about 10 minutes. Approximately 182 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.050" opening. The Vegetable-Beef Dinner is then placed in glass jars and further processed in a conventional manner and as required by 21 C.F.R. §113.

EXAMPLE 5

Five different samples of Mixed Vegetables were prepared at the pilot plant and were assigned numbers PP5535, PP5536, PP5537, PP5538 and PP5539. These samples had the characteristics shown in Tables 15 and 16 below.

TABLE 15

Mixed Vegetables

| Sample Number | Relative Proportions of Orange Carrots | Relative Proportions of White Carrots | Beta Carotene ppm | Beta Carotene Expressed As Vit. A % DV/serv. |
|---|---|---|---|---|
| PP5535 | 100% | 0% | 51.6 | 648% |
| PP5536 | 75% | 25% | 35.5 | 446% |
| PP5537 | 50% | 50% | 24.7 | 310% |
| PP5538 | 25% | 75% | 13.3 | 167% |
| PP5539 | 0% | 100% | 0.3 | 4% |

TABLE 16

Mixed Vegetables
Hunterlab Colormeter Results

| Sample | L | a | b |
|---|---|---|---|
| PP5535 | 54.2 | 15.92 | 24.43 |
| PP5536 | 53.43 | 13.82 | 24.22 |
| PP5537 | 54.08 | 10.64 | 22.90 |
| PP5538 | 55.67 | 6.68 | 22.73 |
| PP5539 | 58.1 | 1.04 | 19.99 |

Pilot Plant Preparation of Sample PP5535

The pilot plant produced these samples on a batch basis, each batch weighing approximately 100 lbs. Pilot plant production of sample number 5535 for Mixed Vegetables was accomplished using a two step procedure, i.e., first, a vegetable puree containing carrots and green beans is prepared; second, the vegetable puree is further processed to produce the Mixed Vegetables. Sample number 5535 used a formula with 100% orange carrots. The vitamin A analysis was 648% of the Daily Value per serving.

Step One—Pilot Plant Puree Production. One hundred and twenty lbs. of frozen orange carrots and 20 lbs. of frozen green beans were placed in a Fitzpatrick Comminutor, Model No. D, at medium speed and a temperature of 195° F.–205° F. (200° F. target). Approximately 32.8 lbs. of water were added through steam injection, resulting in a total batch weight of 172.8 lbs. The spinning knives in the Comminutor and the injected steam comminute the frozen vegetables into a puree that passes through a ³⁄₁₆" or ¼" screen. The puree is then twice passed through a Stephan Microcutter, Model No. MC-12, equipped with a 0.05–0.10 mm ring. The resulting vegetable puree is transferred to a holding tank and is sampled for total solids. The term total solids includes the carbohydrate and cellulose contents of the vegetable puree, most of which is insoluble. Technical personnel then calculate the weight of puree to be added in order to deliver 8.2 lbs. of vegetable puree total solids to the batch.

Step Two—Pilot Plant Manufacturing Procedure for the Product. Technical personnel sampled the aforementioned vegetable puree in the holding tank and determined that it had a total solids content of 8.85%. Personnel then make the following calculation: 8.2 lbs. is divided by 0.0885 (total solids content of puree), resulting in 92.65 lbs. of vegetable puree that needs to be added to the batch. Based on this calculation, personnel placed 92.65 lbs. of the aforementioned vegetable puree in a Koven Kettle that is capable of holding 300 lbs. of product. Five lbs. of frozen peas are then added. Using steam injection, all of the ingredients are cooked in the Koven Kettle at about 200° F. for about 10 minutes. About 3 lbs. of water are added to the batch via the steam injection. The product is transferred from the Koven Kettle to a stockpot and weighed. This batch weighed 100.6 lbs. and no additional water was added.

The product is first microcut using a Stephan Microcutter, Model No. MC-12, equipped with a 0.75 mm ring; the product is microcut a second time using a 0.05–0.10 mm ring. The product is then strained twice through an orifice having a 0.05" opening. The Mixed Vegetables are then placed in glass jars and further processed in a conventional fashion and as further required by 21 C.F.R. §113 et seq "Thermally Processed Low-Acid Foods Packaged in Hermetically Sealed Containers," which is incorporated herein by reference.

Pilot Plant Preparation of Sample PP5536

This version of Mixed Vegetables used a formula containing 75% orange carrots and 25% white carrots. The vitamin A analysis was 446% of the Daily Value per serving.

Step One—Pilot Plant Puree Production. Ninety lbs. of frozen orange carrots, 30 lbs. of frozen white carrots, and 20 lbs. of frozen green beans were placed in a Fitzpatrick Comminutor, Model No. D, at medium speed and a temperature of 195° F. to 205° F. (200° F. target). Approximately 28.95 lbs. of water were added through steam injection in the Comminutor, resulting in a total batch weight of 168.95 lbs. The puree was thereafter processed in the same manner outlined above concerning Sample PP5535.

Step Two—Pilot Plant Manufacturing Procedures for the Product. Technical personnel sampled the aforementioned vegetable puree in the holding tank and determined that it had a total solids content of 9.24%. Personnel then make the following calculation: 8.2 lbs. is divided by 0.0924 (total solids content of puree), resulting in 88.75 lbs. of vegetable puree that needs to be added to the batch. Based on this calculation, personnel placed 88.75 lbs. of the aforementioned vegetable puree was placed in a Koven Kettle that is capable of holding 300 lbs. of product. Five lbs. of frozen peas are then added. Using steam injection, all of the ingredients are cooked in the Koven Kettle at about 200° F. for 10 minutes. About 1.45 lbs. of water were added to the batch via the steam injection. The product is transferred from the Koven Kettle to a stockpot and weighed. Additional water, if necessary, is added to bring the product weight to 100 lbs. In this case, lbs. of water were added to the batch to achieve a total weight of 100 lbs. The product was thereafter processed in the same manner outlined above concerning Sample PP5535.

Pilot Plant Preparation of Sample PP5537

This version of Mixed Vegetables used a formula containing 50% orange carrots and 50% white carrots. The vitamin A analysis was 310% of the Daily Value per serving.

Step One—Pilot Plant Puree Production. Sixty lbs. of frozen orange carrots, 60 lbs. of frozen white carrots, and 20 lbs. of frozen green beans were placed in a Fitzpatrick Comminutor, Model No. D, at medium speed and a temperature of 195° F. to 205° F. (200° F. target). Approximately 28.55 lbs. of water were added through steam injection in the Comminutor, resulting in a total batch weight of 168.55 lbs. The puree was thereafter processed in the same manner outlined above concerning Sample PP5535.

Step Two—Pilot Plant Manufacturing Procedures for the Product. Technical personnel sampled the aforementioned vegetable puree in the holding tank and determined that it had a total solids content of 8.76%. Personnel then make the following calculation: 8.2 lbs. is divided by 0.0876 (total solids content of puree), resulting in 93.6 lbs. of vegetable puree that needs to be added to the batch. Based on this calculation, personnel placed 93.6 lbs. of the aforementioned vegetable puree in a Koven Kettle that is capable of holding 300 lbs. of product. Five lbs. of frozen peas are then added. Using steam injection, all of the ingredients are cooked in the Koven Kettle at about 200° F. for 10 minutes. About 0.2 lbs. of water were added to the batch via the steam injection. The product is transferred from the Koven Kettle to a stockpot and weighed. Additional water, if necessary, is added to bring the product weight to 100 lbs. In this case, 1.2 lbs. of water were added to the batch to achieve a total weight of 100 lbs. The product was thereafter processed in the same manner outlined above concerning Sample PP5535.

Pilot Plant Production of Sample PP5538

This version of Mixed Vegetables used a formula containing 25% orange carrots and 75% white carrots. The vitamin A analysis was 167% of the Daily Value per serving.

Step One—Pilot Plant Puree Production. Thirty lbs. of frozen orange carrots, 90 lbs. of frozen white carrots and 20 lbs. of frozen green beans were placed in a Fitzpatrick Comminutor, Model No. D, at medium speed and a temperature of 195° F. to 205° F. (200° F. target). Approximately 24.45 lbs. of water were added through steam injection, resulting in a total batch weight of 164.45 lbs. The puree was thereafter processed in the same manner outlined above concerning Sample PP5535.

Step Two—Pilot Plant Manufacturing Procedures for the Product. Technical personnel sampled the aforementioned vegetable puree in the holding tank and determined that it had a total solids content of 9.44%. Personnel then make the following calculation: 8.2 lbs. is divided by 0.0944 (total solids content of puree), resulting in 86.85 lbs. of vegetable puree that needs to be added to the batch. Based on this calculation, personnel placed 86.85 lbs. of the aforementioned vegetable puree and 0.15 lbs. of batch water in a Koven Kettle that is capable of holding 300 lbs. of product. Five lbs. of frozen peas are then added. Using steam injection, all of the aforementioned ingredients are cooked in the Koven Kettle at about 200° F. for about 10 minutes. About 0.2 lbs. of water are added to the batch via the steam injection. The product is transferred from the Koven Kettle to a stockpot and weighed. Additional water, if necessary, is added to bring the product weight to 100 lbs. In this case, 7.80 lbs. of water was added to the batch to achieve a total weight of 100 lbs. The product was thereafter processed in the same manner outlined above concerning Sample PP5535.

Pilot Plant Production of Sample PP5539

This version of Mixed Vegetables used a formula containing 100% white carrots. The vitamin A analysis was 4% of the Daily Value per serving.

Step One—Pilot Plant Puree Production. One hundred and twenty lbs. of frozen white carrots and 20 lbs. of frozen green beans were placed in a Fitzpatrick Comminutor, Model No. D, at medium speed and a temperature of 195° F. to 205° F. (200° F. target). Approximately 11.75 lbs. of water were added through steam injection, resulting in a total batch weight of 151.75 lbs. The puree was thereafter processed in the same manner outlined above concerning Sample PP5535.

Step Two—Pilot Plant Manufacturing Procedures for the Product. Technical personnel sampled the aforementioned vegetable puree in the holding tank and determined that it had a total solids content of 9.08%. Personnel then make the following calculation: 8.2 lbs. is divided by 0.0908 (total solids content of puree), resulting in 90.3 lbs. of vegetable puree that needs to be added to the batch. Based on this calculation, personnel placed 90.3 lbs. of the aforementioned vegetable puree in a Koven Kettle that is capable of holding 300 lbs. of product. Five lbs. of frozen peas are then added. Using steam injection, all of the aforementioned ingredients are cooked in the Koven Kettle at about 200° F. for about 10 minutes. About 0.5 lbs. of water were added to the batch via the steam injection. The product is transferred from the Koven Kettle to a stockpot and weighed. Additional water, if necessary, is added to bring the product weight to 100 lbs. In this case, 4.2 lbs. of water were added to the batch to achieve a total weight of 100 lbs. The product was thereafter processed in the same manner outlined above concerning Sample PP5535.

Commercial Production of Mixed Vegetables

Mixed Vegetables may be produced on a commercial basis using a 100% white carrot formula as follows:

| Ingredients | Percentage by weight theoretical | Weight/ Batch |
|---|---|---|
| carrots, frozen (adjusted to provide 12% total solids) | 60.0 | 1800 lbs. |
| green beans, frozen | 10.0 | 300 lbs. |
| peas, frozen | 5.0 | 150 lbs. |
| batch water, estimated | 5.5 | 165 lbs. |
| water from steam injection, estimated | 19.5 | 585 lbs. |
|  | 100% | 3,000 lbs. |

Peeled fresh carrots having a 12% total solids content may be substituted in the above formula for frozen carrots. Carrot puree may be substituted for frozen carrots. If carrot puree is substituted for frozen carrots, the weight of carrot puree added to the batch is variable, depending on the total solids of the carrot puree.

The following two-step method will be used in commercial production of a 3,000 lbs. batch. First, a vegetable puree is prepared using frozen carrots, frozen green beans and frozen peas. In the second step, the vegetable puree is further processed to produce the baby food in commercial quantities.

Step One—Commercial Puree Production.

Eighteen hundred lbs. of frozen white carrots, 300 lbs. of frozen green beans and 150 lbs. of frozen peas are placed in a Fitzpatrick Comminutor, Model No. F-20, at medium speed and a temperature of 200° F.–210° F. (205° F. target). Approximately 450 lbs. of water are added through steam injection. The spinning knives in the Comminutor and the injected steam comminute the frozen vegetables into a puree that passes through a ½" square hole screen. The vegetable puree passes through a trap magnet and is then microcut using a Stephan Microcutter, Model No. 100 or ! 00 DII, equipped with two 0.2 mm rings. The vegetable puree is pumped into a holding tank to be sampled for total solids and to await batching. A minimum total solids of 9.00% is necessary, however, a target total solids of 9.00%–9.49% is desired.

Step Two—Commercial Manufacturing Procedures for the Product. The amount of vegetable puree used in commercial production and the amount of batch water varies based on the total solids content in the vegetable puree. The amount of vegetable puree and batch water is selected based on the following adjustment table.

TABLE 17

VEGETABLE PUREE/BATCH WATER ADJUSTMENT TABLE

| Total Solids Vegetable Puree | | Lbs. Vegetable Puree | Lbs Batch Water |
|---|---|---|---|
| 9.00%–9.49% | Target | 2865 | — |
| 9.50%–9.99% | | 2795 | 70 |
| 10.00%–10.49% | | 2655 | 210 |
| 10.50%–10.99% | | 2529 | 336 |
| 11.00%–11.49% | | 2414 | 451 |
| 11.50%–12.00% | | 2309 | 556 |

Assuming a total solids content of 9.0%–9.49%, 2,865 lbs. of vegetable puree is placed in a Koven Kettle, having a capacity of 3,000 lbs. of product. Using steam injection, the puree is cooked in a Koven Kettle at about 212° F. for about 10 minutes. Approximately 135 lbs. of water are added through the steam injection.

The product is then microcut using a Stephan Microcutter, Model No. 100 or 100 DII, equipped with two 0.2 mm rings. The product then goes through a two stage straining process. The first stage passes the product through a Langsenkamp or F.M.C. strainer having a 0.050" opening. The second stage passes the product through a Langsenkamp strainer having a 0.050" opening. The Mixed Vegetables are then placed in glass jars and further processed in a conventional manner and as required by 21 C.F.R. §113.

Baby foods are produced in different forms, depending on the age of the intended consumer. For example, Beech-Nut Stage 1 products are intended to be consumed by babies from about three months of age. Beech-Nut Stage 2 products are intended to be consumed by babies from above six months of age. Beech-Nut Stage 2 products are strained and will pass through a 0.050 inch orifice. The products heretofore described are all Stage 2 products. Beech-Nut Stage 3 Junior products are intended to be consumed by babies from about nine months of age. Junior products have chunky components that will pass through a ⅜ inch screen.

Applicant intends to use white carrots in varying percentages in several other Stage 2 products as follows:

| Product | Percent Orange | Percent White |
|---|---|---|
| Beef Noodle | 25 | 75 |
| Chicken & Rice | 25 | 75 |
| Chicken Soup | 50 | 50 |
| Vegetable Chicken | 50 | 50 |
| Vegetable Ham | 50 | 50 |
| Turkey Dinner Supreme | 0 | 100 |

Applicant intends to use white carrots in varying percentages in several Stage 3 products as well.

The percentage of white carrots can be varied from 25% to 100% to achieve control of beta-carotene levels and color. Those familiar with carrot cultivation are aware that orange carrots grow more orange in color as they mature in the soil. It is therefore possible to harvest an orange carrot cultivar at an immature stage to reduce the beta-carotene level of the vegetable and/or the end product. It may also be possible to develop a carrot cultivar that does not fit in the categories known to applicant, i.e. orange, (75–150 ppm), yellow (<10 ppm) or white (<10 ppm). For example, it may be possible to develop a new carrot cultivar that has a beta-carotene level of 25 ppm. For purposes of claim interpretation, the low beta-carotene carrots include: a) any carrot cultivar currently in existence that has a nominal beta-carotene content, i.e. white carrots and yellow carrots; b) any new carrot cultivar that may be developed in the future that has a beta-carotene level of less than 50 ppm and c) orange carrots that have been harvested prior to maturity such that they have an average beta-carotene content of less than 50 ppm.

Having now fully described the invention, it will be apparent to one of ordinary skill in the art that many changes and modifications can be made thereto without departing from the spirit of the invention as set forth herein.

We claim:

1. A process for producing a baby food comprising:

selecting at least one vegetable from the group consisting of orange carrots, low beta-carotene carrots, orange sweet potatoes, and white sweet potatoes, at least one of the selected vegetables having a beta-carotene level of at most about 10 ppm by weight;

preparing a puree from the selected vegetables and green beans;

combining said puree, beef, corn, potatoes and water to form a mixture; and cooking said mixture;

thereby to produce said baby food having less than 20 ppm of beta-carotene.

2. A process as set forth in claim 1 wherein the mixture and the baby food are free of flour other than that of the vegetables, green beans, corn and potatoes, and free of starch other than that of vegetables, green beans, corn and potatoes.

3. A process for producing baby food comprising:

selecting at least one vegetable from the group consisting of orange carrots, low beta-carotene carrots, orange sweet potatoes, and white sweet potatoes, at least one of the selected vegetables having a beta-carotene level of at most about 10 ppm by weight;

preparing a puree from the selected vegetables;

combining said puree, turkey, rice and water to form a mixture; and cooking said mixture;

thereby to produce said baby food having less than 20 ppm of beta-carotene.

4. A process as set forth in claim 3 wherein the mixture and the baby food are free of flour other than that of the vegetables and rice, and free of starch other than that of the vegetables and rice.

5. A process for producing baby food comprising:

selecting at least one vegetable from the group consisting of orange carrots, low beta-carotene carrots, orange sweet potatoes, and white sweet potatoes at least one of the selected vegetables having a beta-carotene level of at most about 10 ppm by weight;

preparing a puree from the selected vegetables and peas;

combining said puree from said puree, beef, macaroni, tomato paste and water to form a mixture; and cooking said mixture;

thereby to produce said baby food having less than 20 ppm of beta-carotene.

6. A process as set forth in claim 5 wherein the mixture and the baby food are free of flour other than that of the vegetables, peas, macaroni and tomato paste, and free of starch other than that of the vegetables, peas, macaroni and tomato paste.

7. A process for producing baby food comprising:

selecting at least one vegetable from the group consisting of orange carrots, low beta-carotene carrots, orange sweet potatoes, and white sweet potatoes, at least one of the selected vegetables having a beta-carotene level of at most about 10 ppm by weight;

preparing a puree from the selected vegetables and peas;

combining said puree, beef, potatoes and water to form a mixture; and cooking said mixture;

thereby to produce said baby food having less than 20 ppm of beta-carotene.

8. A process as set forth in claim 7 wherein the mixture and the baby food are free of flour other than that of the vegetables, peas and potatoes, and free of starch other than that of the vegetables, peas and potatoes.

9. A reduced beta-carotene level baby food comprising water, a comminuted whole food selected from the group consisting of white carrots, yellow carrots and combinations thereof, and, optionally, orange carrots, and wherein the orange carrots, white carrots and yellow carrots make up a total carrot content of the baby food and the total of white carrots and the yellow carrots in the baby food make up about 25% to about 100% by weight of the total carrot content.

10. A baby food as set forth in claim 9 wherein the baby food is free of orange carrots.

11. A baby food as set forth in claim 9 wherein the baby food contains orange carrots and white carrots.

12. A baby food as set forth in claim 11 wherein the white carrots are present in an amount at least about equal to one-third the weight of the orange carrots.

13. A baby food as set forth in claim 12 wherein the total carrot content is made up solely of orange carrots and white carrots.

14. A reduced beta-carotene level baby food comprising water and a comminuted whole food, wherein the whole food is white carrots.

15. A reduced beta-carotene level baby food containing at most about 20 ppm by weight beta-carotene and comprising water and a comminuted whole food selected from the group consisting of low beta-carotene carrots, white sweet potatoes, and combinations thereof.

16. A baby food as set forth in claim 15 containing at most about 1 ppm by weight beta-carotene.

17. A baby food as set forth in claim 15 wherein the baby food is able to pass through a 0.05 inch/diameter orifice.

18. A baby food as set forth in claim 15 wherein the white sweet potatoes are selected from the group consisting of White Delight white sweet potatoes, Jersey Sweets white sweet potatoes, Hayman white sweet potatoes, and combinations thereof.

19. A reduced beta-carotene level baby food that is free of added flour and added starch other than that present in whole foods located in the baby food, and comprises water and a comminuted whole food, wherein the whole food is low beta-carotene carrots.

20. A method for preparation of a reduced beta-carotene level baby food, comprising mixing together water and at least two other ingredients, at least one of the at least two other ingredients including a comminuted whole food having a beta-carotene level of less than about 10 ppm by weight and being selected from the group consisting of low beta-carotene carrots, white sweet potatoes, and combinations thereof, to produce a baby food suitable for consumption by babies.

21. A method as set forth in claim 20 wherein the white sweet potatoes are selected from the group consisting of White Delight white sweet potatoes, Jersey Sweets white sweet potatoes, Hayman white sweet potatoes, and combinations thereof.

22. A method for preparation of a reduced beta-carotene level baby food, comprising mixing together water and at least two other ingredients, at least one of the at least two other ingredients including a comminuted whole food selected from the group consisting of low beta-carotene carrots, white sweet potatoes, and combinations thereof, to produce a baby food suitable for consumption by babies, wherein the water and the at least two other ingredients are mixed together to produce the baby food and the baby food has a beta-carotene level of at most about 20 ppm by weight.

23. A method as set forth in claim 22 wherein each of the at least two other ingredients is, or is treated to be, of suitable particulate sizes and texture for a baby food acceptable for consumption by babies and the whole food is selected from the group consisting of white carrots and yellow carrots.

24. A method as set forth in claim 22 wherein the white sweet potatoes are selected from the group consisting of White Delight white sweet potatoes, Jersey Sweets white sweet potatoes, Hayman white sweet potatoes, and combinations thereof.

25. A method for preparation of a reduced beta-carotene level baby food, comprising:
 (a) mixing together water, a pureed whole food selected from the group consisting of low beta-carotene carrots and a combination of low beta-carotene carrots and white sweet potatoes and at least one other food to form a food mixture;
 (b) cooking the food mixture to form a cooked food mixture; and
 (c) comminuting and straining the cooked food mixture, and further treating the cooked food mixture, if necessary, to produce a reduced beta-carotene level baby food suitable for consumption by babies, wherein the baby food produced is able to pass through a 0.05 inch diameter orifice and that contains at most about 20 ppm by weight beta-carotene.

26. A method for preparation of a baby food of a desired level of beta-carotene, comprising mixing together water, orange carrots, an ingredient selected from the group consisting of low beta-carotene carrots, white sweet potatoes and combinations thereof, and at least one other food, wherein the orange carrots and the ingredient are mixed in a relative weight ratio selected so that the baby food prepared by the method contains the desired level of beta-carotene.

27. A method as set forth in claim 26 wherein the desired level of beta-carotene is at most about 20 ppm by weight.

28. A method as set forth in claim 26 wherein the ingredient is a comminuted whole food.

29. A method as set forth in claim 28 wherein the comminuted whole food is selected from the group consisting of low beta-carotene carrots, White Delight white sweet potatoes, Jersey Sweets white sweet potatoes, Hayman white sweet potatoes, and combinations thereof.

30. A method as set forth in claim 29 wherein the whole food is selected from the group consisting of white carrots, yellow carrots and combinations thereof.

31. A method as set forth in claim 30 wherein the whole food is white carrots.

* * * * *

UNITED STATES PATENT AND TRADEMARK OFFICE
CERTIFICATE OF CORRECTION

PATENT NO. : 5,723,166
DATED : March 3, 1998
INVENTOR(S) : Theuer et al.

It is certified that error appears in the above-indentified patent and that said Letters Patent is hereby corrected as shown below:

In claim 5, line 4, insert a comma between the word "potatoes" and "at".

In claim 17, line 2, remove the slash ("/") from between the words "inch" and "diameter".

Insert the following under References Cited, under the heading "OTHER PUBLICATIONS":

Ameny et al., Protein Quality Of Weaning Baby Food From African White Fleshed Sweetpotato Varieties And Apios Americana With Pigeon Peas Added As A Complementary Protein, Nutrition Research, 14(9):1397 - 1406

Signed and Sealed this

Twenty-eighth Day of July, 1998

Attest:

BRUCE LEHMAN

Attesting Officer

Commissioner of Patents and Trademarks